(12) United States Patent
Aoyama

(10) Patent No.: US 6,724,941 B1
(45) Date of Patent: Apr. 20, 2004

(54) IMAGE PROCESSING METHOD, IMAGE PROCESSING DEVICE, AND RECORDING MEDIUM

(75) Inventor: Tatsuya Aoyama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/409,665

(22) Filed: Sep. 30, 1999

(30) Foreign Application Priority Data

Sep. 30, 1998 (JP) .......................................... 10-278739

(51) Int. Cl.[7] ................................................ G06K 9/40
(52) U.S. Cl. ........................ 382/254; 382/263; 382/298
(58) Field of Search ................................. 382/254, 263, 382/132, 260, 264, 298; 358/447, 532, 530

(56) References Cited

U.S. PATENT DOCUMENTS 5,696,850 A * 12/1997 Parulski et al. ............. 382/261
5,978,522 A * 11/1999 Ishii et al. ................... 382/299
6,055,340 A *  4/2000 Nagao ........................ 382/261
6,075,902 A *  6/2000 Kojima ....................... 382/260

FOREIGN PATENT DOCUMENTS

JP        A61-109550          5/1986

* cited by examiner

Primary Examiner—Yon J. Couso
(74) Attorney, Agent, or Firm—Birch, Stewart, Kolasch & Birch

(57) ABSTRACT

An image processing method includes a step for inputting the type of digital camera used for obtaining an original image signal to be processed, a step for preparing a non-sharp mask signal of the original image signal, a step for reading a contrast table and a density dependent table corresponding to the type of digital camera from a hard disk device, a step for carrying out sharpness enhancement processing based on the contrast table, the density dependent table, the non-sharp mask signal and the original image signal so that the maximum value of responses of the spatial frequency characteristics of an image signal on which the sharpness enhancement processing has been effected is a value in the region of 1.5 to 3.0 times the spatial frequency characteristics of the original image signal. Accordingly, spatial frequency enhancement processing can be carried out under preferred processing conditions on the original image signal obtained by the digital still camera.

18 Claims, 15 Drawing Sheets

F I G. 3 A
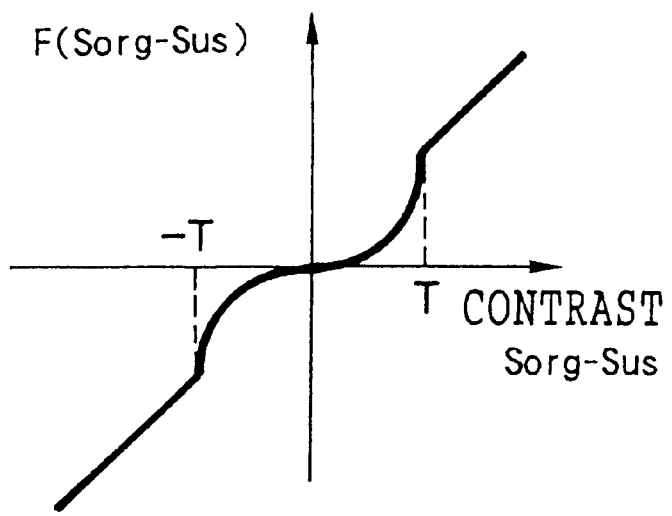
F I G. 3 B
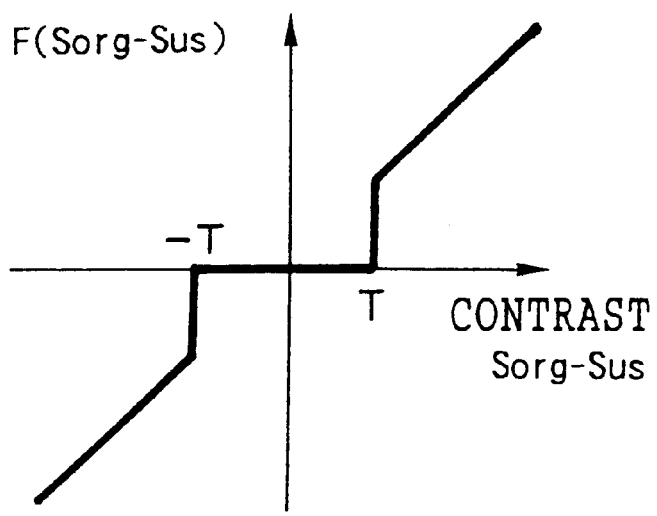

| 0.0625 | 0.125 | 0.0625 |
|---|---|---|
| 0.125 | 0.25 | 0.125 |
| 0.0625 | 0.125 | 0.0625 |

F I G. 7 A
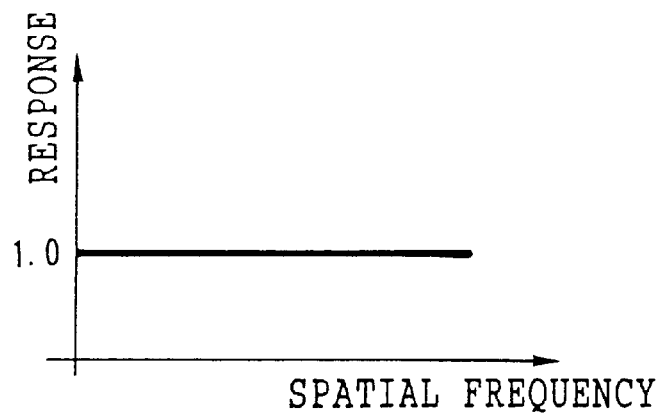
F I G. 7 B
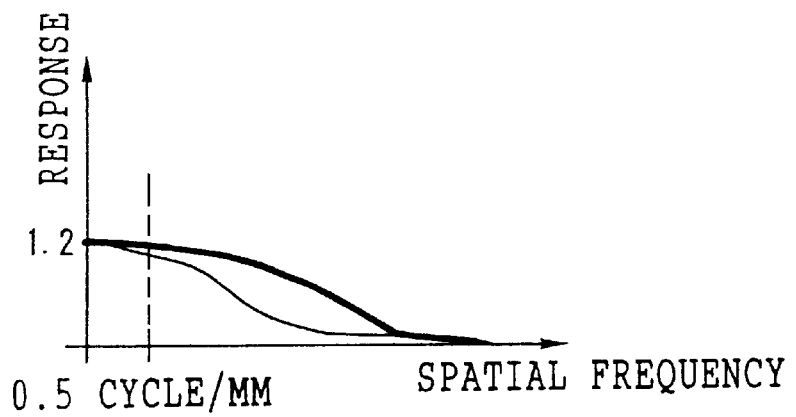
F I G. 7 C
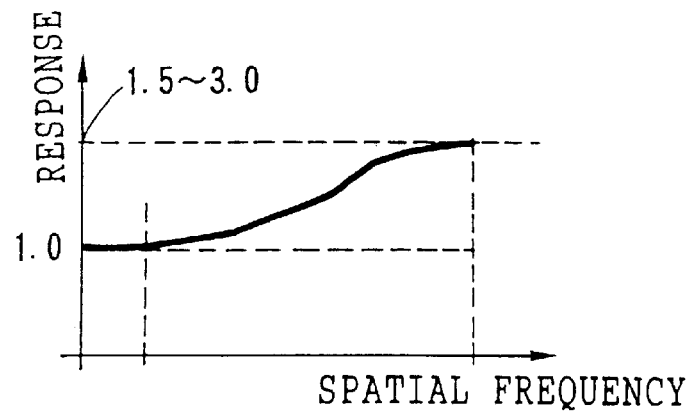

F I G. 8 A
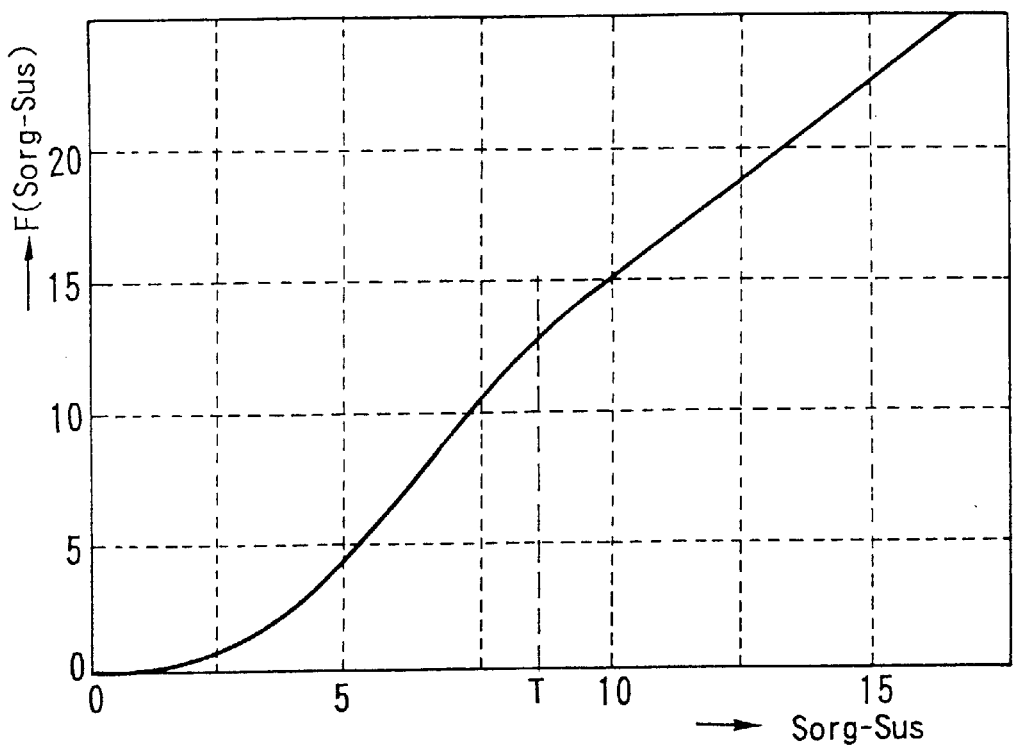
F I G. 8 B
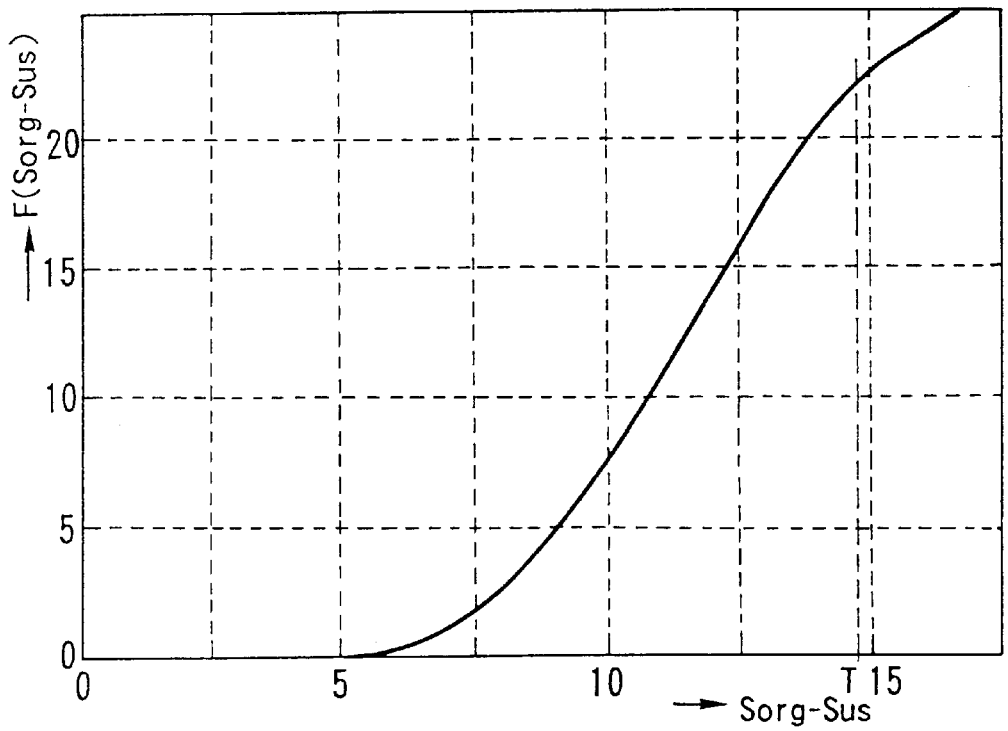

IN A CASE OF TWOFOLD ENLARGEMENT

F I G. 1 1 A
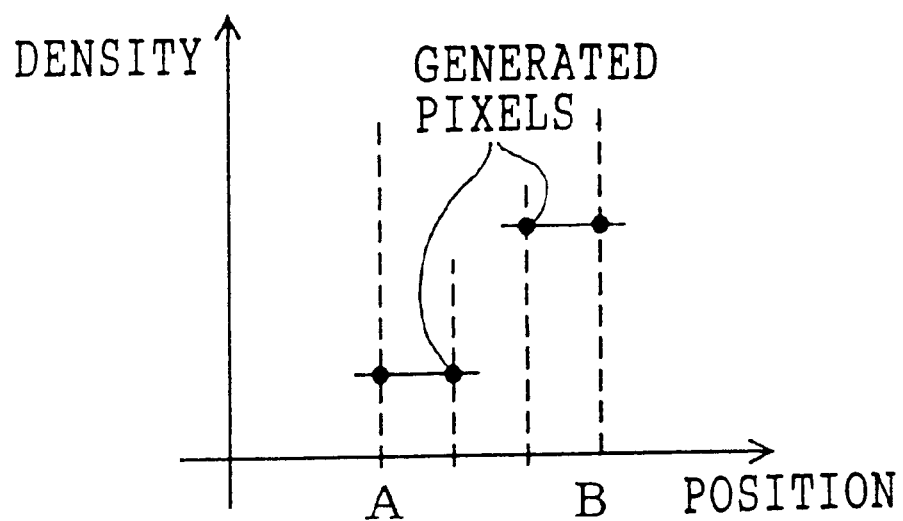
F I G. 1 1 B
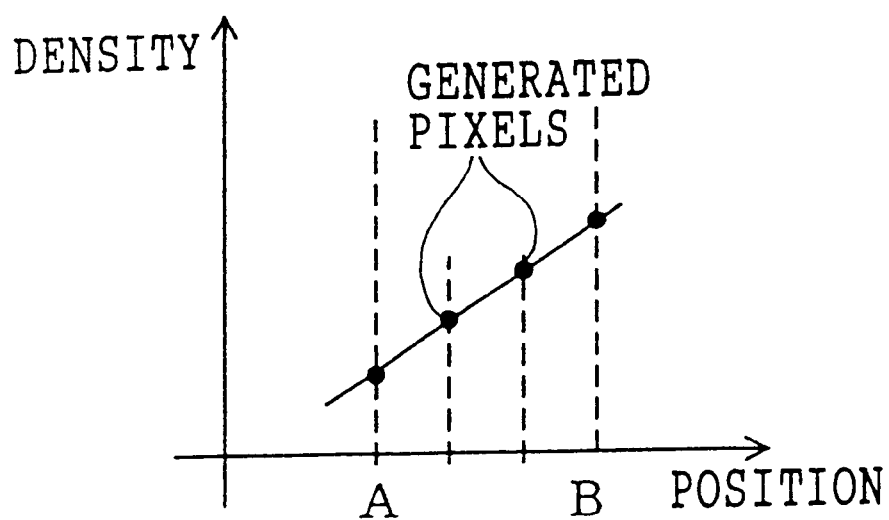

F I G. 1 6 A
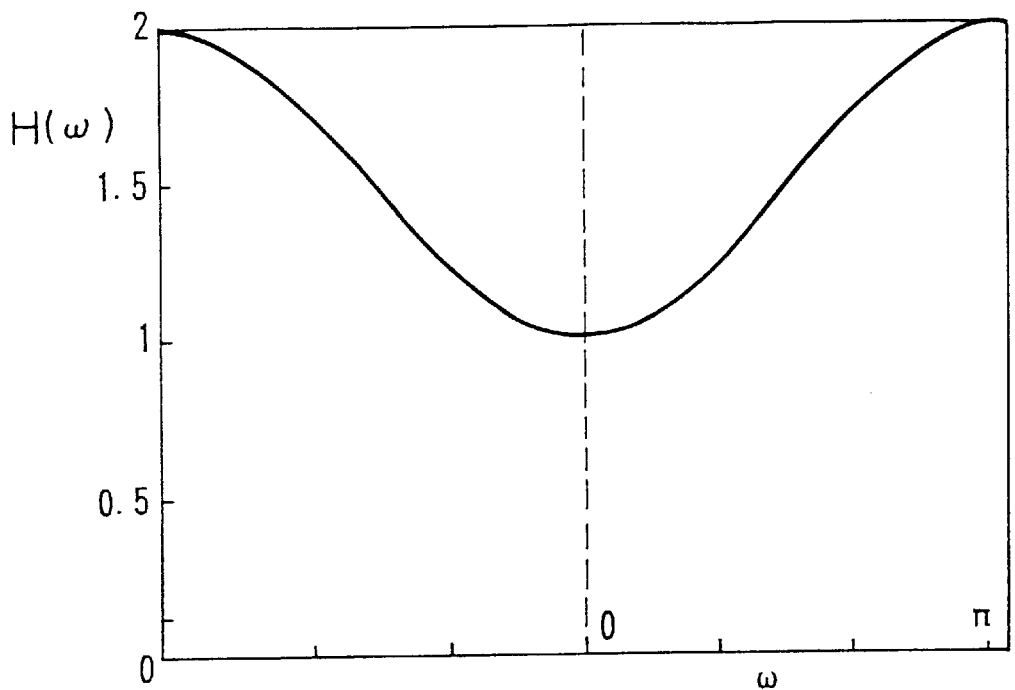
F I G. 1 6 B
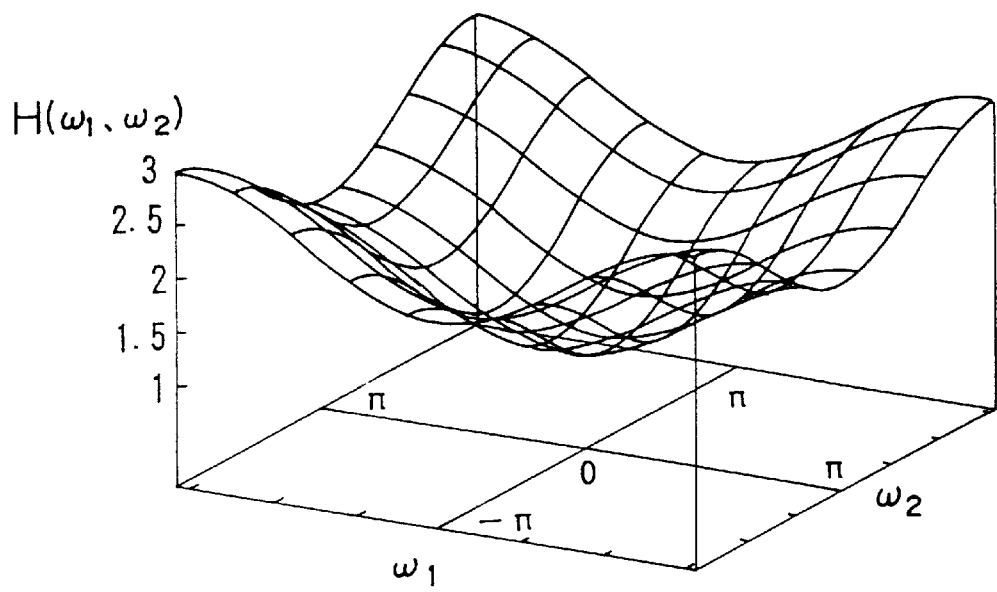

IMAGE PROCESSING METHOD, IMAGE PROCESSING DEVICE, AND RECORDING MEDIUM

BACKGROUND OF THE INVENTION

1. Field of the Invention

The present invention relates to an image processing method, an image processing device and a recording medium, and in particular, to an image processing method which carries out spatial frequency enhancement processing on an original image signal (image data) obtained by a digital still camera under preferred processing conditions, an image processing device to which the image processing method can be applied, and a recording medium on which a program for a computer to execute the image processing method is recorded.

2. Description of the Related Art

Conventionally, with the object of turning the image quality of an image, which is expressed by an original image signal obtained by image pick-up using a video camera or photography using a digital still camera or the like, into an image quality which is visually preferable, spatial frequency enhancement processing for enhancing the sharpness of the image expressed by the above original image signal, which is known as sharpness enhancement processing, is carried out.

In carrying out sharpness enhancement processing such as that described above, an image of an image quality that is visually more preferable can be obtained by setting processing conditions according to a combination of an input device and an output device. The input device is used in obtaining an original image signal and the output device is used in outputting the image based on the original image signal. Thus, examinations have conventionally been made of preferred processing conditions for sharpness enhancement processing in accordance with a combination of various types of input devices and output devices.

Japanese Patent Application Laid-Open (JP-A) No. 61-109550 has made an examination of processing conditions of the sharpness enhancement processing in which a digital X-ray image is inputted, and the processed image is outputted onto a CRT monitor or a X-ray film.

In this way, the optimization of the processing conditions of sharpness enhancement processing in accordance with the combination of the input device and the output device has become an essential technique in realizing a high image quality.

However, since the digital still camera is a device that has been put to practical use relatively recently and only a limited number of manufacturers deal in both devices, i.e., the digital still camera and a printer for recording an original image signal, which is obtained by photography using the digital still camera, on a recording medium, there has been a problem in that, the conditions obtained as processing conditions for sharpness enhancement processing at the time when an image is recorded on a recording medium based on an original image signal obtained by photography using a digital still camera have not been necessarily the optimum ones.

Further, some types of recent digital still cameras carry out sharpness processing within the camera. In these types of digital still cameras, an output thereof is adjusted to the sharpness that is preferable for viewing on a monitor. Moreover, the image setting, which is preferable for viewing on a monitor, differs from manufacturer to manufacturer among manufacturers of digital still cameras. As a result, there exist a variety of sharpness images, and even when an image, which is preferable for viewing on a monitor, is outputted as it is by a printer, the sharpness of the image may be insufficient.

SUMMARY OF THE INVENTION

The present invention has been attained to solve the above-described problems, and an object thereof is to provide an image processing method, an image processing device and a recording medium in which spatial frequency enhancement processing can be carried out under preferred processing conditions on original image signals obtained by a digital camera, which include an original image signal of an image on which sharpness processing is not effected by a digital still camera or an original image signal of an image on which sharpness processing has been effected by a digital still camera so as to look preferable for viewing on a monitor.

In order to achieve the above object, an image processing method relating to a first aspect of the present invention carries out spatial frequency enhancement processing on an original image signal obtained by photography using a digital still camera in such a manner that the maximum value of responses of the spatial frequency characteristics of an image signal on which the spatial frequency enhancement processing has been effected is a value in the range of 1.5 to 3.0 times the maximum value of responses of the spatial frequency characteristics of the original image signal on which the spatial frequency enhancement processing has not been effected yet.

The inventors carried out a subjective evaluation experiment that utilized an image which was the result of spatial frequency enhancement processing on an original image signal that had been obtained by photography using a plurality of existing digital still cameras.

The respective conditions of the subjective evaluation experiment were as follows:

evaluators: 8 persons;

types of digital still cameras that were used for the evaluation: five types, i.e., digital still cameras from A to E;

degree of spatial frequency enhancement processing: the maximum value of responses of the spatial frequency characteristics in the image signal on which the spatial frequency enhancement processing has been effected is 1.5 times, 2.0 times, 2.5 times, 3.0 times, 3.5 times, 4.0 times or 4.5 times the maximum value of responses of the spatial frequency characteristics in the original image signal;

number of scenes to be evaluated: 10 scenes for each type of digital camera (5 scenes each having an image mainly of a person, and 5 scenes each having an image mainly of a landscape);

evaluation method: each image was compared with the original image so as to be given one of the following 5 grades ⊚: improved considerably ○: improved Δ: in comparison with the original image, some parts were improved but others were deteriorated, or equivalent to the original image X: deteriorated XX: deteriorated considerably.

In table 1, an example of evaluation results for 5 scenes each having an image mainly of a landscape is shown. In table 2, an example of evaluation results for 5 scenes each having an image mainly of a person is shown.

TABLE 1

|  | 1.5 | 2.0 | 2.5 | 3.0 | 3.5 | 4.0 | 4.5 |
|---|---|---|---|---|---|---|---|
| Digital camera A | Δ | ○ | ⊚ | ⊚ | ○ | Δ | x |
| Digital camera B | Δ | ○ | ⊚ | ○ | Δ | Δ | Δ |
| Digital camera C | ○ | ○ | Δ | Δ | x | xx | xx |
| Digital camera D | Δ | ○ | ⊚ | ○ | Δ | x | xx |
| Digital camera E | Δ | ⊚ | ○ | ○ | Δ | x | x |

TABLE 2

|  | 1.5 | 2.0 | 2.5 | 3.0 | 3.5 | 4.0 | 4.5 |
|---|---|---|---|---|---|---|---|
| Digital camera A | Δ | ○ | ⊚ | ○ | Δ | x | x |
| Digital camera B | Δ | ○ | ○ | ○ | Δ | Δ | Δ |
| Digital camera C | ○ | Δ | Δ | x | xx | xx | xx |
| Digital camera D | Δ | ⊚ | ○ | Δ | x | xx | xx |
| Digital camera E | Δ | ○ | ⊚ | Δ | x | xx | xx |

Table 3 shows the results of the evaluation of all the scenes to be evaluated by all the evaluators. These results have been made numerical by the expression, the number of scenes to be evaluated× the number of persons. (For example, if chosen by all the evaluators, the result is 10 scenes×5 types×8 persons=400.)

TABLE 3

|  | 1.5 | 2.0 | 2.5 | 3.0 | 3.5 | 4.0 | 4.5 |
|---|---|---|---|---|---|---|---|
| ⊚ | 10 | 80 | 105 | 90 | 20 | 0 | 0 |
| ○ | 210 | 290 | 250 | 180 | 115 | 65 | 25 |
| Δ | 180 | 30 | 40 | 105 | 175 | 200 | 165 |
| x | 0 | 0 | 5 | 25 | 60 | 75 | 125 |
| xx | 0 | 0 | 0 | 0 | 30 | 60 | 85 |
| ratio of ⊚ and ○ | 55.0% | 92.5% | 88.8% | 67.5% | 33.8% | 16.3% | 6.3% |

From the results of the subjective evaluation described above, the information was obtained: when the maximum value of the spatial frequency characteristics in the image signal on which the spatial frequency enhancement processing has been effected is in the range of 1.5 to 3.0 times the maximum value of responses of the spatial frequency characteristics of the original image signal, a larger proportion of evaluators (equal to or more than 50%) answered that the image was improved in comparison with the original image, and thus images of visually preferable image quality can be obtained in this range. Particularly, the range of 2.0 to 2.5 times is more preferable.

Based on the evaluation results described above, according to the image processing method of the first aspect, as spatial frequency enhancement processing is carried out on an original image signal obtained by photography using a digital still camera in such a manner that the maximum value of responses of the spatial frequency characteristics of an image signal on which the spatial frequency enhancement processing has been effected is in the range of 1.5 to 3.0 times the maximum value of responses of the spatial frequency characteristics of the original image signal on which the spatial frequency enhancement processing has not been effected yet, the spatial frequency enhancement processing can be carried out under preferred processing conditions on the original image signal obtained by photography using a digital still camera.

In the meantime, if conventional spatial frequency enhancement processing is carried out on an original image signal, noise in the image signal is also enhanced. Further, as image signals obtained by photography using a digital still camera are generally compressed by the JPEG method, many image signals contain a good deal of noise. Accordingly, when conventional spatial frequency enhancement processing is carried out on an image signal obtained by photography using a digital still camera, the image obtained as the result has a low image quality whose noise is conspicuous.

Thus, enhancement to portions having small contrast values of the original image signal is suppressed because these portions are considered to be noise components. Only portions having large contrast values are enhanced because these portions are considered to be edge components. As a result, a sharp image can be produced without enhancing noise.

On the other hand, in images expressed by original image signals that are obtained by photography using a digital still camera, there is a general tendency for dark images to contain more noise. For this reason, for example, when conventional spatial frequency enhancement processing is carried out on an image signal of an image photographed in an underexposed manner, noise becomes especially conspicuous. Thus, by suppressing the degree of enhancement when the density of the image is high (when the image is dark), deterioration of the image quality resulting from noise can be prevented.

In view of the above-described points, in an image processing method relating to a second aspect of the present invention, the spatial frequency enhancement processing in the first aspect is carried out based on the following expression:

$$S_{proc}=S_{org}+G(S_{org})\times F(S_{org}-S_{us}) \quad (1)$$

Here, $S_{org}$ expresses the original image signal, $S_{us}$ expresses a non-sharp mask signal, $G(S_{org})$ expresses a function dependent on the original image signal $S_{org}$, and $F(S_{org}-S_{us})$ expresses a function dependent on a contrast value of the original image signal. It should be noted that the non-sharp mask signal $S_{us}$ used here refers to a signal of a non-sharp image whose original image signal is soft-focused so as to contain exclusively the components whose spatial frequencies are lower than the predetermined spatial frequency (what is known as a soft-focus image).

$F(S_{org}-S_{us})$ is a function that depends on a contrast value of an original image signal. Therefore, by incorporating the function into the above expression (1), for example, such operations as described above, i.e., suppressing enhancement of the portions that have small contrast values of the original image signal by considering these portions to be noise components and enhancing only the portions that have large contrast values by considering these portions to be edge components, are made possible.

Further, $G(S_{org})$ is a function that depends on an original image signal. Therefore, by incorporating the function into the above expression (1), for example, such operations as described above, i.e., suppressing the degree of enhancement when the density of the image is high (when the image is dark), are made possible.

In this way, according to the image processing method relating to the second aspect, the same effect as that of the first aspect can be produced, and as the spatial frequency enhancement processing is carried out based on the expression incorporating the function dependent on the contrast value of the original image signal as well as the function dependent on the original image signal, an image signal whose noise is not conspicuous and which has the high image quality can be obtained.

In the mean time, a grain of noise, which is contained in an original image signal obtained by photography using a digital still camera, is generally large in comparison with an ordinary photographic image. Therefore, if the low frequency band in the spatial frequency characteristics is enhanced to excess, noise becomes considerably conspicuous. For this reason, in the spatial frequency enhancement processing effected on the original image signal obtained by photography using a digital still camera, it is preferable to suppress the enhancement of the above low frequency band. Particularly, in regard to the spatial frequency characteristics of the non-sharp mask signal $S_{us}$, the inventors have obtained information that on an image outputted by using the image signal on which the spatial frequency enhancement processing has been effected by utilizing the non-sharp mask signal, when a response in the spatial frequency of 0 to 0.5 cycle/mm is made more than 1.2 times larger than a response before the spatial frequency enhancement processing, a visually preferable image cannot be obtained.

Thus, in an image processing method relating to a third aspect of the present invention, the spatial frequency characteristics of the non-sharp mask signal $S_{us}$ in the second aspect is such that on an image outputted by using an image signal on which the spatial frequency enhancement processing has been effected, a response of the spatial frequency of 0 to 0.5 cycle/mm is equal to or less than 1.2 times a response before the spatial frequency enhancement processing.

In this way, according to the image processing method relating to the third aspect, as the spatial frequency characteristics of the non-sharp mask signal $S_{us}$ is such that on an image output using by an image signal on which the spatial frequency enhancement processing has been effected, a response of the spatial frequency of 0 to 0.5 cycle/mm is equal to or less than 1.2 times the response before the spatial frequency enhancement processing, the degree of enhancement in the low frequency band can be suppressed. As a result, an image signal whose noise is less conspicuous and which has a high image quality can be obtained.

As described above, enhancement of the portions having small contrast values of the original image signal is suppressed because these portions are considered to be noise components. Only the portions having large contrast values are enhanced because these portions are considered to be edge components. As a result, a sharp image can be produced without enhancing noise.

Thus, in an image processing method relating to a fourth aspect of the present invention, the function $F(S_{org}-S_{us})$ in the second or third aspect has the characteristics that, which is obtained by subtracting the non-sharp mask signal $S_{us}$ from the original image signal $S_{org}$, is smaller than a predetermined threshold value, the function $F(S_{org}-S_{us})$ is smaller than the contrast value. In an image processing method relating to a fifth aspect of the present invention, the function $F(S_{org}-S_{us})$ in the fourth aspect has the characteristics that, when the absolute value of the contrast value is smaller than a predetermined threshold value, the function $F(S_{org}-S_{us})$ is 0.

In this way, in the image processing methods relating to the fourth and fifth aspects, the same effect as that of the second or third aspect can be produced, and because the characteristics of the function $F(S_{org}-S_{us})$ are such that, when the absolute value of a contrast value, i.e. the magnitude of the contrast value, is smaller than a predetermined threshold value, the magnitude of the function $F(S_{org}-S_{us})$ is smaller than the contrast value, an image which is sharp and whose noise is not conspicuous can be produced.

As to the predetermined threshold value in the fourth and fifth aspects, based on the subjective evaluation utilizing the original image signals obtained by photography using many types of existing digital still cameras, the inventors have obtained information that the threshold value is preferably in the range of 2 to 10% of the maximum value of the original image signal.

In the meantime, as described above, when the density of the image expressed by the original image signal obtained by photography using a digital still camera is high (when the image is dark), deterioration of the image quality resulting from noise can be prevented by suppressing the degree of enhancement.

Thus, in an image processing method relating to a sixth aspect, the function $G(S_{org})$ in any aspect of the second to fifth aspects has the characteristics in which the value thereof decreases, as the density of an image on which the spatial frequency enhancement processing has not been effected yet becomes higher.

In this way, in the image processing method relating to the sixth aspect, the same effect as that of the second to fifth aspects can be produced, and as the characteristics of the function $G(S_{org})$ in the second to fifth aspects are such that the value thereof decreases as the density of an image on which the spatial frequency enhancement processing has not been effected yet becomes higher, deterioration of the image quality resulting from noise can be prevented.

In the meantime, when an original image signal which is obtained by photography using a digital still camera is used for outputting onto a photosensitive material or the like, enlargement processing or reduction processing may sometimes be carried out on the above original image signal according to the size and the like of the output.

FIG. 18A shows an example of the spatial frequency characteristics of an image signal that is enlarged by 8/7 times by a linear interpolation method, and FIG. 18B shows an example of the spatial frequency characteristics of an image signal that is enlarged by 8/7 times by a cubic B-spline interpolation method. From FIGS. 18A and 18B, it is understood that the spatial frequency characteristics vary depending on the type of enlargement/reduction method.

With this point in view, an image processing method relating to a seventh aspect of the present invention carries out enlargement processing or reduction processing on an original image signal obtained by photography using a digital still camera, and, in carrying out spatial frequency enhancement processing, adjusts a response of the spatial frequency characteristics of an image signal on which the spatial frequency enhancement processing has been effected, according to the spatial frequency characteristics of the enlargement processing or the reduction processing.

In this way, according to the image processing method relating to the seventh aspect, as a response of the spatial frequency characteristics of an image signal on which the spatial frequency enhancement processing has been effected is adjusted according to the spatial frequency characteristics of enlargement processing or reduction processing, the spatial frequency enhancement processing can be carried out under preferred processing conditions corresponding to the type of enlargement method or reduction method.

Here, if a response of the spatial frequency characteristics of enlargement processing or reduction processing is added to the results of the subjective evaluation shown in FIG. 3, as in an image processing method of an eighth aspect of the present invention, it is preferable that the adjustment in the seventh aspect is such that the maximum value of responses of the spatial frequency characteristics, in which the spatial frequency characteristics of the above-described enlargement processing or the above-described reduction processing and the spatial frequency characteristics of an image signal on which the spatial frequency enhancement processing has been effected are combined, is a value in the range of 1.0 to 2.5 times the maximum value of responses of the spatial frequency characteristics of the original image signal on which the spatial frequency enhancement processing has not been effected yet.

FIG. 18C shows the spatial frequency characteristics of an image signal that is enlarged by 10/7 times by the cubic B-spline interpolation method (except for the scale of enlargement, the conditions are the same as those show in FIG. 18B). From FIGS. 18B and 18C, it is understood that even if the type of enlargement/reduction method is the same, the spatial frequency characteristics vary according to the scale of enlargement or the scale of reduction.

Further, for example, when an original image is small and thus required to be enlarged considerably in order to make a print, the image quality of an enlarged image greatly deteriorates. Therefore, if spatial frequency enhancement processing is carried out on an image signal expressing the enlarged image, the image quality further deteriorates.

From the above-described point of view, as in an image processing method relating to a ninth aspect of the present invention, it is preferable that the adjustment in the seventh aspect is an adjustment in accordance with the scale of enlargement when the enlargement processing is carried out, or with the scale of reduction when the reduction processing is carried out.

More specifically, as the scale of enlargement increases, the response of the spatial frequency characteristics of the image signal on which the spatial frequency enhancement processing has been effected is decreased, and as the scale of reduction increases, the above response is increased.

Further, an image processing device relating to a tenth aspect of the present invention includes controlling means for effecting control so that spatial frequency enhancement processing is carried out on an original image signal obtained by photography using a digital still camera in such a manner that the maximum value of responses of the spatial frequency characteristics of an image signal on which the spatial frequency enhancement processing has been effected is a value in the range of 1.5 to 3.0 times the maximum value of responses of the spatial frequency characteristics of the original image signal on which the spatial frequency enhancement processing has not been effected yet.

According to the tenth aspect of the present invention, control is effected by the controlling means so that spatial frequency enhancement processing is carried out on an original image signal obtained by photography using a digital still camera in such a manner that the maximum value of responses of the spatial frequency characteristics of an image signal on which the spatial frequency enhancement processing has been effected is a value in the range of 1.5 to 3.0 times the maximum value of responses of the spatial frequency characteristics of the original image signal on which the spatial frequency enhancement processing has not been effected yet.

In this way, according to the image processing device of the tenth aspect, as control is effected so that spatial frequency enhancement processing is carried out on an original image signal obtained by photography using a digital still camera in such a manner that the maximum value of responses of the spatial frequency characteristics of an image signal on which the spatial frequency enhancement processing has been effected is a value in the range of 1.5 to 3.0 times the maximum value of responses of the spatial frequency characteristics of the original image signal on which the spatial frequency enhancement processing has not been effected yet, as in the first aspect of the present invention, the spatial frequency enhancement processing can be carried out under preferred processing conditions on the original image signal obtained by photography using a digital still camera.

Further, an image processing device relating to an eleventh aspect of the present invention includes enlargement/reduction means for carrying out enlargement processing or reduction processing on an original image signal obtained by photography using a digital still camera, and adjusting means for adjusting a response of the spatial frequency characteristics of an image signal on which the spatial frequency enhancement processing has been effected, according to the spatial frequency characteristics of the enlargement processing or the reduction processing.

According to the eleventh aspect of the present invention, enlargement processing or reduction processing is carried out by the enlargement/reduction means on an original image signal obtained by photography using a digital still camera, and a response of the spatial frequency characteristics of an image signal on which the spatial frequency enhancement processing has been effected is adjusted by the adjusting means according to the spatial frequency characteristics of the enlargement processing or the reduction processing.

In this way, according to the image processing device of the eleventh aspect, as a response of the spatial frequency characteristics of an image signal on which spatial frequency enhancement processing is effected is adjusted according to the spatial frequency characteristics of the enlargement processing or the reduction processing, as in the seventh aspect of the present invention, the spatial frequency enhancement processing can be carried out under preferred processing conditions in accordance with the type of enlargement method or reduction method.

Further, a recording medium relating to a twelfth aspect of the present invention has a program recorded thereon for allowing a computer to execute processing that includes a step in which spatial frequency enhancement processing is carried out on an original image signal obtained by photography using a digital still camera in such a manner that the maximum value of responses of the spatial frequency characteristics of an image signal on which the spatial frequency enhancement processing is effected is a value in the range of 1.5 to 3.0 times the maximum value of responses of the spatial frequency characteristics of the original image signal on which the spatial frequency enhancement processing has not been effected yet.

Since the recording medium relating to the twelfth aspect of the present invention has a program recorded thereon for allowing a computer to execute processing that includes the above step, in other words, processing according to the image processing method relating to the invention of the first aspect, spatial frequency enhancement processing can be carried out under preferred processing conditions on an original image signal obtained by photography using a digital still camera, as in the first aspect of the present invention, when the computer reads and executes the program recorded on the recording medium.

Further, a recording medium relating to a thirteenth aspect of the present invention has a program recorded thereon for allowing a computer to execute processing that includes a first step in which enlargement processing or reduction processing is carried out on an original image signal obtained by photography using a digital still camera, and a second step in which a response of the spatial frequency characteristics of an image signal on which the spatial frequency enhancement processing has been effected is adjusted according to the spatial frequency characteristics of the enlargement processing or the reduction processing.

Since the recording medium relating to the thirteenth aspect of the present invention has a program recorded thereon for allowing a computer to execute processing that includes the above-described first and second steps, in other words, processing according to the image processing method relating to the seventh aspect of the present invention, spatial frequency enhancement processing can be carried out under preferred processing conditions in accordance with the type of enlargement method or reduction method, as in the seventh aspect of the present invention, when the computer reads and executes the program recorded on the recording medium.

BRIEF DESCRIPTION OF THE DRAWINGS

FIGS. 3A and 3B are graphs respectively showing an example of a contrast table.

FIG. 6A is a schematic view showing locations of pixels expressed by i and j in expression (2); and FIG. 6B is a schematic view showing an example of a weight K (m, n) in expression (3).

FIGS. 7A through 7C are graphs respectively showing an example of spatial frequency characteristics in each process of sharpness enhancement processing in the first embodiment: FIG. 7A is a graph showing an example of the spatial frequency characteristics of an original image signal; FIG. 7B is a graph showing an example of the spatial frequency characteristics of a non-sharp mask signal; and FIG. 7C is a graph showing an example of the spatial frequency characteristics of an image signal on which the sharpness enhancement processing has been effected.

FIGS. 8A and 8B are graphs respectively showing an example of a contrast table.

FIG. 11A is a graph illustrating a condition of interpolation using the nearest neighbor interpolation method, and FIG. 11B is a graph illustrating a condition of interpolation using a linear interpolation method.

FIG. 12A is a graph showing an example of the spatial frequency characteristics of an original image signal; FIG. 12B is a graph showing an example of the spatial frequency characteristics of an image signal on which enlargement processing has been effected; and FIG. 12C is a graph showing an example of the spatial frequency characteristics of an image signal on which sharpness enhancement processing has been effected.

FIGS. 16A and 16B are graphs respectively showing a high frequency enhancement filter: FIG. 16A is a graph showing an example of a one-dimensional high frequency enhancement filter; and FIG. 16B is a graph showing an example of a two-dimensional high frequency enhancement filter.

FIG. 17A shows an example of the spatial frequency characteristics of an original image signal; FIG. 17B shows an example of the spatial frequency characteristics of a high frequency enhancement filter; and FIG. 17C shows an example of the spatial frequency characteristics of an image signal on which the sharpness enhancement processing has been effected.

FIG. 18A is a graph showing the spatial frequency characteristics of an image signal that is, enlarged by 8/7 times by a linear interpolation method; FIG. 18B is a graph showing the spatial frequency characteristics of an image signal that is enlarged by 8/7 times by a cubic B-spline interpolation method; and FIG. 18C is a graph showing the spatial frequency characteristics of an image signal that is enlarged by 10/7 times by the cubic B-spline interpolation method.

DESCRIPTION OF THE PREFERRED EMBODIMENTS

Figure 1:
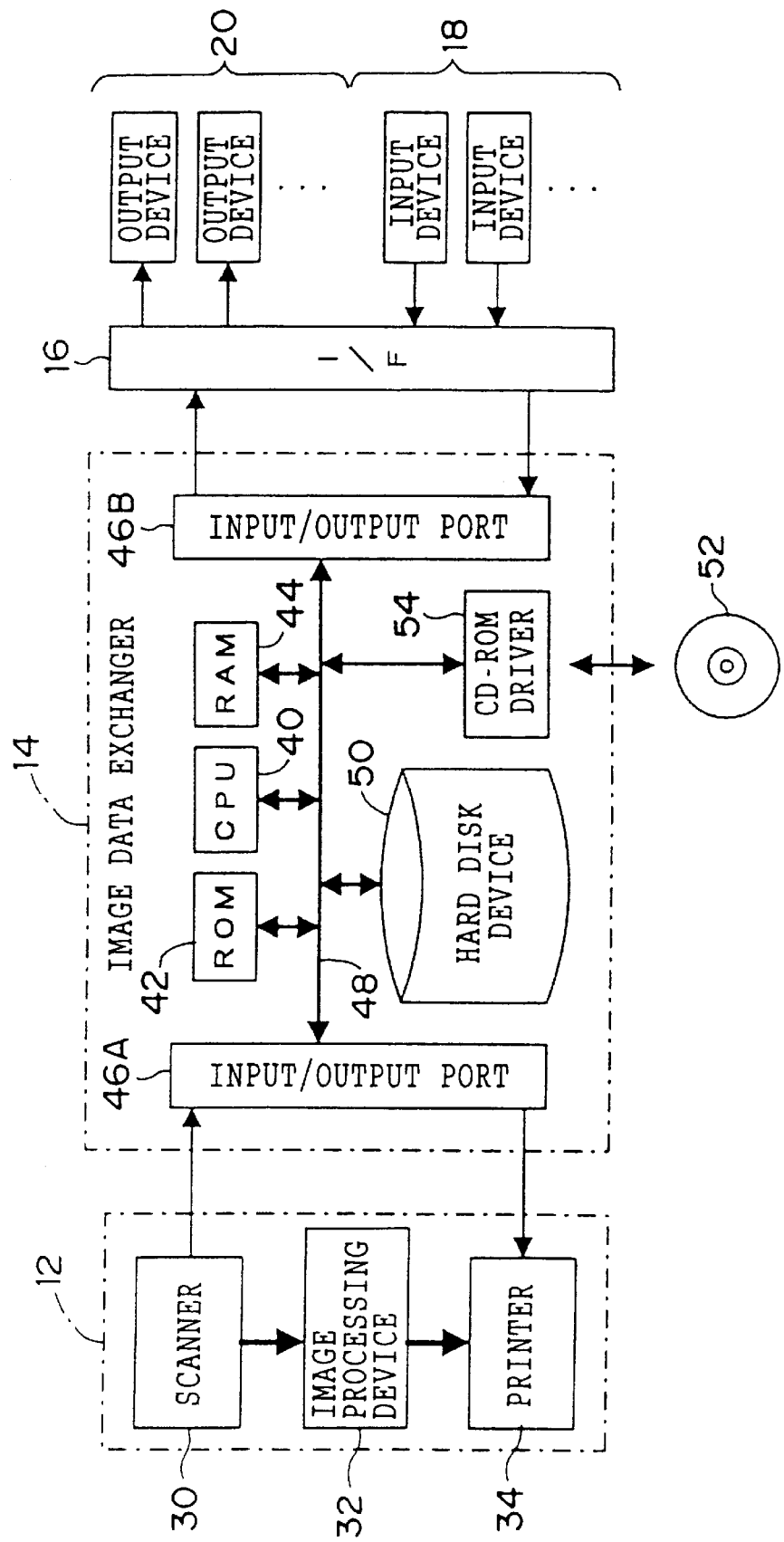
FIG. 1 is a block diagram illustrating a schematic structure of an image processing system relating to each embodiment of the present invention.

Referring now to the drawings, an embodiment of the present invention will be hereinafter described in detail.

First Embodiment

FIG. 1 illustrates an image processing system 10 relating to the present embodiment. In the image processing system 10, an input device group 18 and an output device group 20 are connected to a digital lab system 12 via an image data exchanger 14 and an interface (I/F) circuit 16. The digital lab system 12 is capable of high speed processing in which a film image (a negative image or a positive image which, after the photographing of a subject, is made visible due to developing processing) recorded on a photographic photosensitive material (hereinafter referred to simply as "photographic film"), which is, for example, a phonographic photographic film (e.g., a negative film or a reversal film), is read and recorded onto a photographic paper.

The input device group 18 is structured by different types of input devices, which input image data to the image data exchanger 14. Examples of the input devices that can be applied to form the input device group 18 are an information storage medium reading device 22 (see FIG. 2), a communications control device (not illustrated) which receives and inputs image data sent from another information processing equipment connected thereto via a communications line, and the like. Any of various types of information storage media, such as magnetic disks including floppy disks (FDs), optical disks including CD-Rs, mange-to-optical disks (MOs), PC cards or IC cards (hereinafter referred to as "digital camera cards") loadable into digital still cameras (DSCs, hereinafter referred to simply as "digital cameras"), is set at the information storage medium reading device 22. The information storage media reading device 22 reads and inputs the image data stored on the information storage medium set thereat.

Further, the output device group 20 is structured by different types of output devices which carry out image output processing on the basis of image data for output which is transferred thereto from the image data exchanger 14. Examples of the output devices that can be applied to form the output device group are an information storage media writing device which, as the image output processing, writes image data onto an information storage medium such as a CD-R (e.g., a CD-R writer 24 shown in FIG. 2 which writes image data onto a CD-R which serves as the information storage medium); an image display device which, as the image output processing, displays the image on a display means such as a display; a communications control device which, as the image output processing, transmits image data to another information processing device connected thereto via a communications line; and the like.

The file structures of the image data inputted from the respective input devices forming the input device group 18 are not the same, and often differ from one another. Therefore, when image data is inputted to the I/F circuit 16 from an input device, the I/F circuit 16 determines the file structure of the inputted image data, which is then converted into a predetermined file structure and inputted to the image data exchanger 14. Further, although the file structure of the image data transferred to an output device from the exterior is specified in advance, the file structures often differ from output device to output device among the output devices forming the output device group 20. Thus, in a case in which image data is transferred from the image data exchanger 14 to an output device, the I/F circuit 16 converts the file structure of the image data to be transferred to a file structure corresponding to the output device which is to receive the transfer (the output device which is the transfer location).

The digital lab system 12 is formed by a scanner 30, an image processing device 32, and a printer 34 which are connected in series. The scanner 30 includes a reading sensor such as an area CCD sensor or the like so that the reading sensor carries out a reading of a film image recorded on a photographic film. The image data obtained by the reading of the film image is outputted to the image processing device 32 and used in the image outputting processing carried out by the printer 34 (i.e. the recording of the image onto a photographic printing paper). On the other hand, the image data, which is instructed to be used in the image outputting processing carried out by an output device other than the printer 34, is also outputted to the image data exchanger 14.

The image processing device 32 is equipped with various types of image processing circuits (not illustrated) which subject the inputted image data to various types of image processings as image processings for exposing and recording the image onto a photographic printing paper at the proper image quality. Examples of these various types of image processings are pixel density conversion, color conversion, hypertone processing for compressing the gradation of the super-low frequency brightness components of the image, hypersharpness processing for enhancing the sharpness while suppressing graininiess, and special image processings (e.g., correction of "red-eye" or correction of deterioration in the image quality due to aberration of an LF lens with respect to a film image which is photographed and recorded by an LF (lens-fitted film package)). The image processing device 32 calculates the processing conditions of the image processings to be carried out at the respective image processing circuits. The respective image processing circuits carry out various image processings on the image data according to the operated processing conditions so that the image data which has been subjected to the image processing is outputted to the printer 34 as the image data for recording.

The printer 34 is equipped with R, G, B laser light sources, and a laser driver 64 which controls the operation of the laser light sources (not illustrated). The R, G, B laser light emitted from the laser light sources is modulated by the image data for recording which has been inputted, so that the modulated laser light is scanned onto a photographic printing paper. As a result, an image is exposed and recorded onto the photographic printing paper. The photographic printing paper on which the image has been exposed and recorded is sent to a processor section (not illustrated) and is subjected to various processings such as color developing, bleach fixing, washing and dying. In this way, the image which has been exposed and recorded on the photographic printing paper is made visible. The image data which has been transferred to the printer 34 from the image data converter 14 is also used for modulation of laser light, in other words, the exposing and recording of an image onto the photographic printing paper, in the same way as described above.

As illustrated in FIG. 1, the image data exchanger 14 includes an information processing device, a hard disk device 50, and a CD-ROM driver 54. The information processing device is a personal computer or a work station or the like, and is structured such that a CPU 40, a ROM 42, a RAM 44, and input/output ports 46A and 46B are connected together via a bus 48. The hard disk device 50 includes a large capacity information storage medium (hard disk) and is connected to the bus 48. The CD-ROM drive 54 reads a program and the like from a CD-ROM 52 loaded therein. The scanner 30 and the printer 34 of the digital lab system 12 are connected to the input/output port 46A. The input device group 18 and the output device group 20 are connected to the input/output port 46B via the I/F circuit 16.

The image data exchanger 14 temporarily stores, in the hard disk integrated into the hard disk device 50, the image data inputted from the scanner 30 and the respective input devices of the input device group 18. Accordingly, the hard disk integrated into the hard disk device 50 functions as a spool 60 (see FIG. 2) which accumulates and stores the image data inputted to the image data exchanger 14. Further, the image data exchanger 14 adds property information, which expresses the attributes and the like of the image data, to the inputted image data before temporarily storing the image data in the spool 60. Then, the inputted image data is temporarily stored in the spool 60 after the aforementioned property information is added to the image data.

Further, various types of image processing programs for carrying out the various image processings on the image data are stored in the hard disk integrated into the hard disk device 50. The CPU 40 of the image data exchanger 14 selectively executes these programs as needed at predetermined times (a time which is at least one of before the image data is temporarily stored in the spool 60 and after the image data temporarily stored in the spool 60 is read), and carries out various types of image processings on the image data. In this way, the image data exchanger 14 is also equipped to function as an image processing engine 62 for carrying out various types of image processings (see FIG. 2).

Figure 2:
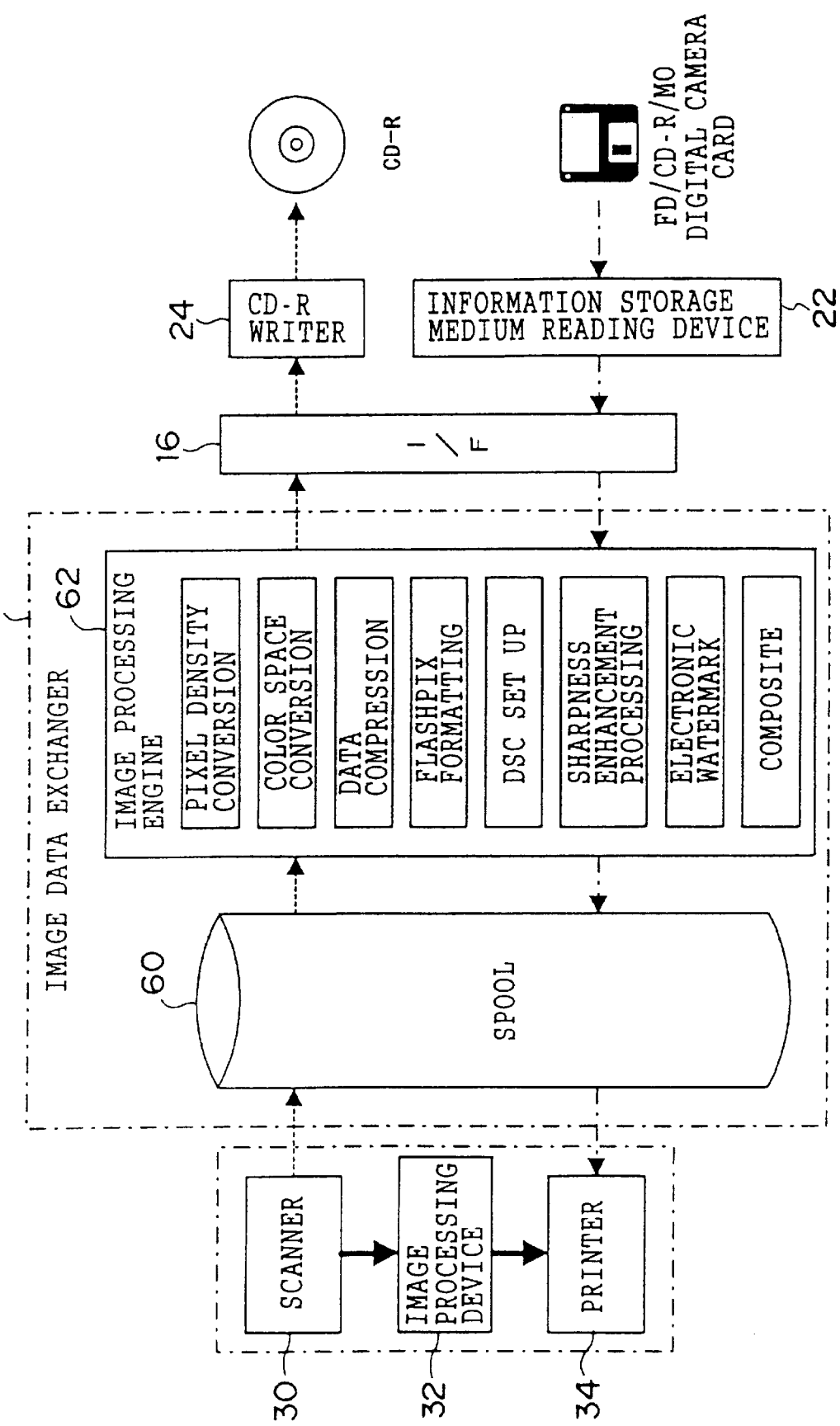
FIG. 2 is a conceptual view illustrating a flow of processing of image data in a case in which an information storage medium reading device serving as an input device and a CD-R writer serving as an output device are connected in the image processing system of FIG. 1.

As illustrated in FIG. 2, various types of image processings are readied as the image processings effected on the image data in the present embodiment. Such image processings include "pixel density conversion" for converting image data into image data having a different pixel density (number of pixels), "color space conversion" for converting image data into image data having a different color space, "data compression (or decompression)", "FlashPix formatting" for carrying out conversion into (or conversion from) image data of a predetermined format called Flashpix (a format including image data of a plurality of types of resolutions (pixel densities), which differ from one another, wherein the respective image data of the different resolutions are divided into a plurality of small regions (which are called tiles)), "DSC set up" which is processing for improving the image quality of image data obtained by photography using a digital camera, "sharpness enhancement processing" for improving the sharpness of an image, "electronic watermark" for embedding predetermined electronic watermark data in the image data in order to prevent improper reproduction of image data and the like, "Composite" for synthesizing a plurality of types of image data to generate image data of a single image (e.g., image data for creating New Year cards or the like), and the like. It should be noted that the "pixel density conversion" described above corresponds to the enlargement processing or reduction processing of the present invention, and the "sharpness enhancement processing" described above corresponds to the spatial frequency enhancement processing of the present invention.

A sharpness enhancement processing program for allowing the CPU 40 of the image data exchanger 14 to execute the "sharpness enhancement processing," which is among the various types of image processings described above, is stored in the CD-ROM 52 at the beginning, together with programs for allowing the CPU 40 to execute other image processings (see FIG. 1). When the CD-ROM 52 is loaded into the CD-ROM drive 54 and an instruction to transfer (to install) a program from the CD-ROM 52 to the image data exchanger 14 is given, the sharpness enhancement processing program and other programs are read from the CD-ROM 52 by the CD-ROM drive 54 and stored in the hard disk integrated into the hard disk device 50.

Then, when the time has come to execute the sharpness enhancement processing, the sharpness enhancement processing program is read from the hard disk integrated into the hard disk device 50 so as to be stored in the RAM 44 (it may be structured such that the programs for the respective image processings are read and stored in the RAM 44 when the image data exchanger 14 is turned on), so that the sharpness enhancement processing program is executed by the CPU 40 of the image data exchanger 14. As a result, the image data exchanger 14 functions as the image processing device relating to the present invention. It should be noted that the programs for other image processings are read and executed in the same manner as described above.

In this way, the CD-ROM 52 and the hard disk integrated into the hard disk device 50 that store the sharpness enhancement processing program and programs for other image processings correspond to the recording medium of the present invention.

Next, as operation of the present embodiment, a description will be given of an example wherein, in an aspect (see FIG. 2) in which the information storage medium reading device 22 (and the CD-R writer 24) are connected to the image data exchanger 14, image data is transferred from the information storage medium reading device 22 to the printer 34 of the digital lab system 12.

In the image processing system 10, there exist the following cases. An FD or an MO, on which is stored image data that a user has processed using his own information processing device such as his own personal computer, is brought to the image processing system 10, and the making of prints from the FD or MO is requested. A digital camera card, on which is stored image data obtained by photography using a digital camera, is brought to the image processing system 10, and the making of prints from the digital camera card is requested. A CD-R, on which is written image data which has been transferred from the scanner 30 via the image data exchanger 14 and the CD-R writer 24, is brought to the image processing system 10, and the making of prints (reprints) from the CD-R is requested.

In such cases, the information storage medium brought in by the user is set at the corresponding information storage medium reading device 22 (one of an FD drive, a CD drive, an MO drive, a card reader, and the like). The information storage medium reading device 22 in which the information storage medium is set reads the image data to be processed from the information storage medium that has been set, and thereafter, together with attribute information expressing the various attributes of the image data to be processed and information expressing that the output location of the image data is the printer 34, the image data that has been read is transferred to the image data exchanger 14.

The image data, which is transferred from the information storage medium reading device 22, is converted into a predetermined file structure at the I/F circuit 16, and thereafter, is inputted to the image data exchanger 14. From information expressing that the input source of the image data is the information storage medium reading device 22 and expressing the output location of the image data inputted together with the image data, the image processing engine 62 of the image data exchanger 14 recognizes that the inputted image data to be processed is image data which is to be outputted to the printer 34. Before the image data to be processed is stored in the spool 60, the image processing engine 62 carries out optimal image processings in accordance with the output location (printer 34) and with the attributes of the image data to be processed which depend on the input source (the type of information storage medium reading device 22).

Here, when the information storage medium reading device 22 is a device for reading image data from a digital camera card (i.e., a card reader), the image processing engine 62 determines that the image data that has been inputted is image data which is generated by photography using a digital camera and stored in the digital camera card (in this case, the image data is compressed for the storage), and thereafter, carries out image processings such as the "DSC set up", the "sharpness enhancement processing", and the like. The "DSC set up" includes decompressing the compressed image data, converting the image data into image data having a resolution (pixel density) appropriate for recording the image onto a photographic printing paper, and color correction and density correction processings. The "sharpness enhancement processing" improves the sharpness of the image.

In a predetermined region of the hard disk device 50 (not illustrated), a contrast table and a density dependent table that correspond to the existing major digital cameras are stored.

The contrast table is a table for obtaining the value of the function F ($S_{org}-S_{us}$) in the above-described expression (1), and the density dependent table is a table for obtaining the value of the function G($S_{org}$) in the above-described expression (1).

Figure 4:
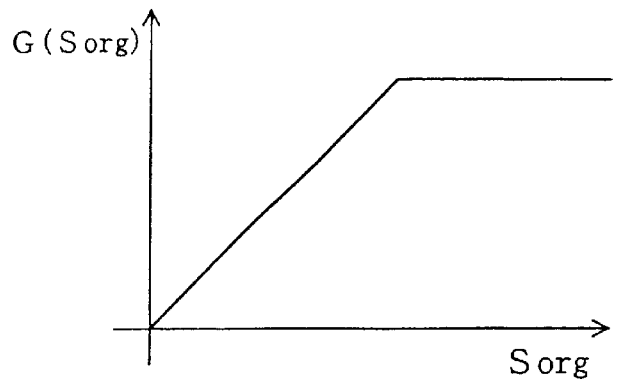
FIG. 4 is a graph showing an example of a density dependent table.

Examples of the contrast tables are shown in FIGS. 3A and 3B, and an example of the density dependent table is shown in FIG. 4.

The contrast table shown in FIG. 3A has the characteristics that when the absolute value of a contrast value (an original image signal $S_{org}$—a non-sharp mask signal $S_{us}$) of the original image signal $S_{org}$ (in this case, image data stored in the digital camera card) is smaller than a predetermined threshold value T, a value that is smaller than the contrast value is obtained, and when the absolute value of a contrast value of the original image signal $S_{org}$ is equal to or larger than the above threshold value T, the contrast value is obtained as it is. Further, the contrast table shown in FIG. 3B has the characteristic that zero is obtained when the absolute value of a contrast value of the original image signal $S_{org}$ is smaller than the above threshold value T.

In other words, the value corresponding to the function F ($S_{org}$–$S_{us}$) in the above-described fourth embodiment can be obtained by the contrast table shown in FIG. 3A, and the value corresponding to the function F ($S_{org}$–$S_{us}$) in the above-described fifth aspect can be obtained by the contrast table shown in FIG. 3B.

On the other hand, the density dependent table shown in FIG. 4 has the characteristic that a value such as the one which will suppress the degree of enhancement can be obtained when the value of the original image signal $S_{org}$ is smaller than a predetermined value, in other words, when the density of the image is high.

In other words, in the density dependent table shown in FIG. 4, a value corresponding to the function G ($S_{org}$) in the above-described sixth embodiment can be obtained.

The contrast table and the density dependent table are set in advance in such a manner that in relation to the original image signal $S_{org}$ obtained by photography using a corresponding digital camera, the maximum value of responses of the spatial frequency characteristics of an image signal on which the sharpness enhancement processing has been effected is a value in the range of 1.5 to 3.0 times the maximum value of responses of the spatial frequency characteristics of the original image signal $S_{org}$. It should be noted that in this case, adjustment of the value of the response of the spatial frequency characteristics of the image signal on which the sharpness enhancement processing has been effected can be carried out by changing the size of at least one slope of a slope of the contrast table and a slope of the density dependent table.

Figure 5:
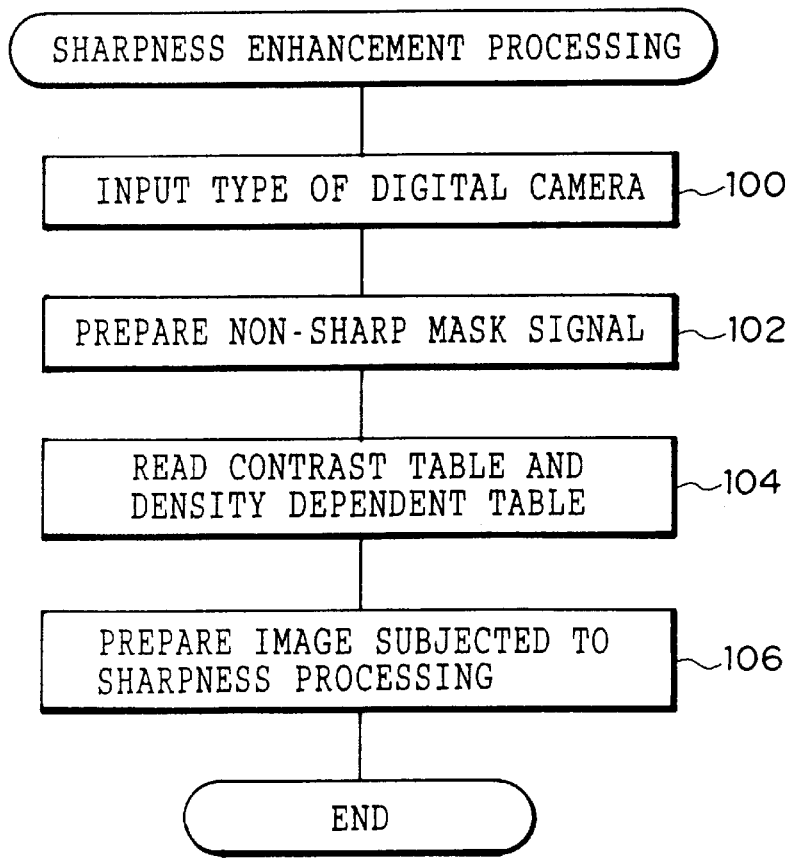
FIG. 5 is a flow chart illustrating the procedures of sharpness enhancement processing in a first embodiment.

Referring now to the flow chart of FIG. 5, a description will be hereinafter given of sharpness enhancement processing that is carried out when the image processing engine 62 (the CPU 40 of the image data exchanger 14) executes the sharpness enhancement processing program on the original image signal $S_{org}$ that has been read from the digital camera card.

Firstly, in step 100, the type of digital camera used in obtaining the original image signal $S_{org}$ to be processed is inputted. It should be noted that the inputting of the type of digital camera is carried out by fetching a number indicating the type, which has been inputted, for example, by an operator via an unillustrated keyboard or the like.

In the subsequent step 102, the non-sharp mask signal $S_{us}$ is generated from the original image signal $S_{org}$ that has been read from the digital camera card. The non-sharp mask signal $S_{us}$ can be generated, for example, by a method using simple averaging, or by a method using weighted addition, and for example, based on pixel data of pixels of the total 9 points, i.e., an attention point and eight other points adjacent to the attention point in the original image signal $S_{org}$.

The method using simple averaging calculates the non-sharp mask signal $S_{us}$ by the following expression (2). It should be noted that $S_{us}$ (i, j) of the expression (2) expresses a non-sharp mask value of the attention point. Further, in FIG. 6A, pixel locations of the original image signal $S_{org}$ and the non-sharp mask signal $S_{us}$ that are expressed by i and j in the expression (2) are shown (in FIG. 6A, "S" is used to express both the original image signal $S_{org}$ and the non-sharp mask signal $S_{us}$).

$$S_{us}(i, j) = \frac{\sum_{m=i-1}^{i+1} \sum_{n=j-1}^{j+1} S_{org}(m, n)}{3 \times 3} \quad (2)$$

In other words, in the above expression (2), as a non-sharp mask signal $S_{us}$ of the attention point, an additive average value of the pixel data of the pixels of the total 9 points, i.e., the attention point and the eight other points adjacent to the attention point is set.

On the other hand, the method using weighted addition calculates the non-sharp mask signal $S_{us}$ by the following expression (3). It should be noted that K (m, n) in the expression (3) is a weight that has been set in advance, and examples thereof are shown in FIG. 6B.

$$S_{us}(i, j) = \sum_{m=i-1}^{i+1} \sum_{n=j-1}^{j+1} K(m, n) \times S_{org}(m, n) \quad (3)$$

Figures 6A, 6B:
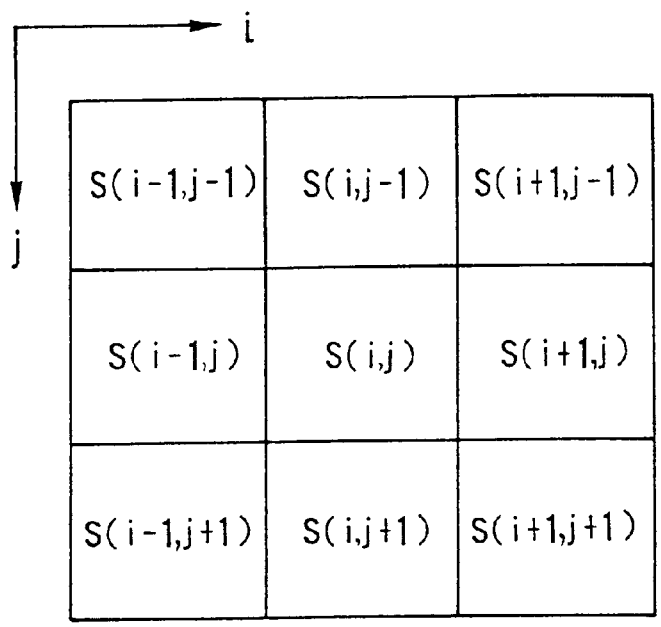
FIGS. 6A and 6B are charts respectively explaining how a non-sharp mask signal is prepared.

In other words, in the above expression (3), a non-sharp mask signal $S_{us}$ of the attention point is set by multiplying weights as shown in FIG. 6B which are located so as to correspond to the respective pixel data of the pixels of the total 9 points, i.e., the attention point and the eight other points adjacent to the attention point, and by adding up the values for the above nine points that are obtained as the result of the above multiplication. It should be noted that in the weights shown in FIG. 6B, the attention point has a maximum weight, each of the four points, i.e., two points above and below the attention point and two points on the left-hand side and the right-hand side of the attention point, has half the weight of the attention point, and each of the four points adjacent to the attention point in the oblique direction has a fourth of the weight of the attention point.

Here, as shown in FIG. 7B, the spatial frequency characteristics of the non-sharp mask signal $S_{us}$ are such that on an image outputted by using an image signal on which the spatial frequency enhancement processing has been effected, a response of the spatial frequency of 0 to 0.5 cycle/mm is equal to or less than 1.2 times a response before the spatial frequency enhancement processing.

After the preparation of the non-sharp mask signal $S_{us}$ is completed, in the next step 104, the contrast table and the density dependent table corresponding to the type of digital camera, which has been inputted in the above step 100, are read from the hard disk device 50.

In the subsequent step 106, based on the contrast table and the density dependent table that have been read in the above step 104, the non-sharp mask signal $S_{us}$ that has been prepared in the above step 102, and the original image signal $S_{org}$, an image signal $S_{proc}$ on which the sharpness enhancement processing has been effected is prepared using the above expression (1). The sharpness enhancement processing is then completed.

As shown in FIG. 7C, the maximum value of responses of the spatial frequency characteristics of the image signal $S_{proc}$, which can be obtained by the above sharpness enhancement processing, is a value in the range of 1.5 to 3.0 times the maximum value of responses of the spatial frequency characteristics of the original image signal $S_{org}$ (see FIG. 7A). Accordingly, a visually good image can be obtained.

As is shown in detail in the above description, in the image processing method and the image processing device relating to the first embodiment, the maximum value of responses of the spatial frequency characteristics of the image signal $S_{proc}$ on which the sharpness enhancement processing is effected is a value in the range of 1.5 to 3.0 times the maximum value of responses of the spatial frequency characteristics of the original image signal $S_{org}$. Accordingly, the sharpness enhancement processing can be carried out under preferred processing conditions.

Further, in the image processing method and the image processing device relating to the first embodiment, as the image signal $S_{proc}$ is prepared by taking into consideration the values obtained by the expression (1) with the use of the contrast table and the density dependent table, an image signal $S_{proc}$ whose noise is not conspicuous and which has a high image quality can be obtained.

Moreover, in the image processing method and the image processing device relating to the first embodiment, the spatial frequency characteristics of the non-sharp mask signal $S_{us}$ are such that on an image outputted by using an image signal on which the spatial frequency enhancement processing has been effected, a response of the spatial frequency of 0 to 0.5 cycle/mm is equal to or less than 1.2 times a response before the spatial frequency enhancement processing. Accordingly, the degree of enhancement in the low frequency band can be suppressed, and an image signal whose noise is less conspicuous and which has a high image quality can be obtained.

Second Embodiment

Next, a description will be given of the second embodiment relating to the present invention. It should be noted that the structure of the image processing system 10 relating to the second embodiment is the same as that of the first embodiment described above. Therefore, the description thereof will be omitted.

Figure 9:
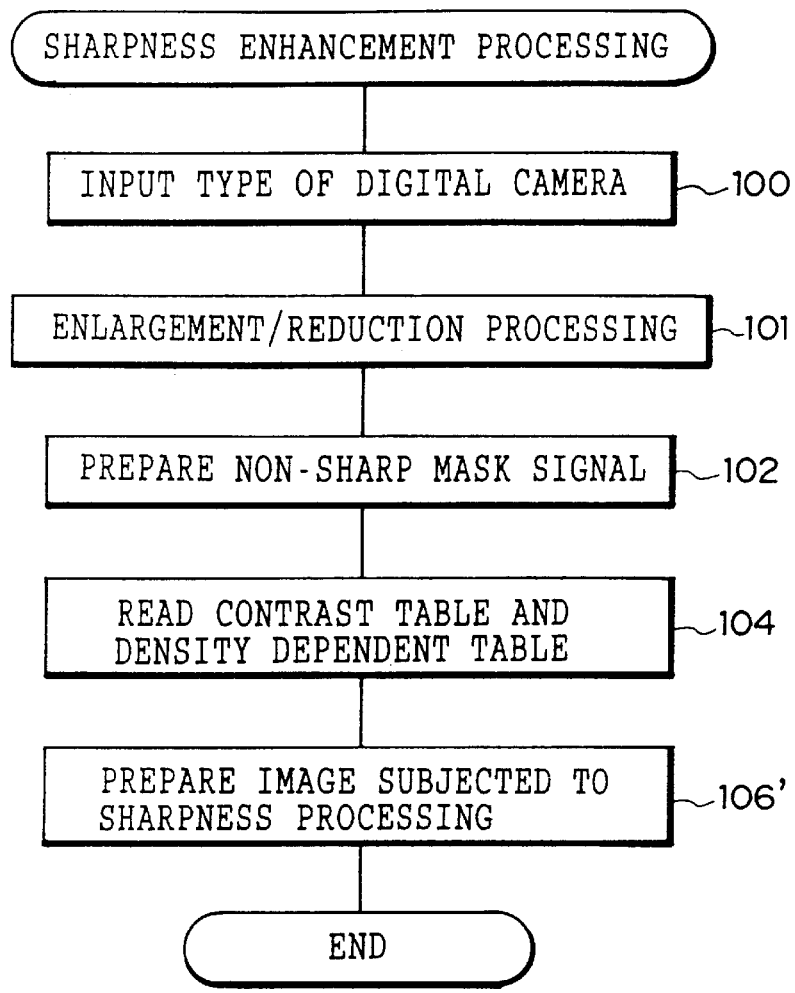
FIG. 9 is a flow chart illustrating the procedures of sharpness enhancement processing in a second embodiment.

First, referring to the flow chart of FIG. 9, a description will be given of sharpness enhancement processing that is carried out when the image processing engine 62 (the CPU 40 of the image data exchanger 14) in the second embodiment executes the sharpness enhancement processing program. It should be noted that the steps of FIG. 9 that carry out the same processing as in FIG. 5 are denoted by the same step numbers as in FIG. 5, and description thereof will be limited.

In step 101, enlargement processing or reduction processing is effected on the original image single $S_{org}$. The examples of the enlargement/reduction processing that can be applied include a nearest neighbor interpolation method and a linear interpolation method.

Figure 10:
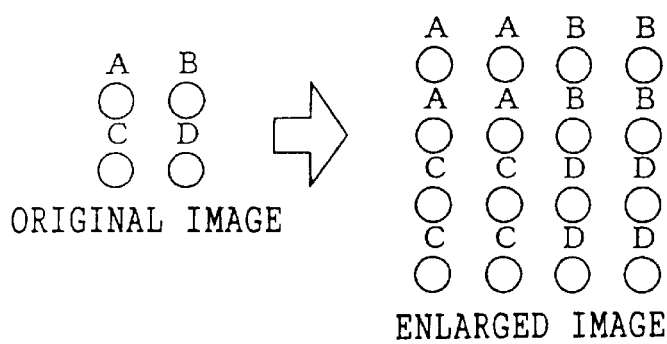
FIG. 10 is a schematic view illustrating a condition enlarged twofold by a nearest neighbor interpolation method.

In the nearest neighbor interpolation method, the pixel data (density) of a pixel that is generated after the enlargement is given the value of pixel data of the original image that is nearest to the pixel. FIG. 10 illustrates conditions of an original image and an enlarged image in a case of twofold enlargement. As shown in FIG. 10, when an original image of 2×2 size, with pixels each having a value of A, B, C and D, is enlarged by twofold, the pixel data for two pixels that are newly generated between the respective pixels is set in the following manner: the value of A is set to the pixels whose pixel data are adjacent to the pixels having the value of A; the value of B is set to the pixels whose pixel data are adjacent to the pixels having the value of B; the value of C is set to the pixels whose pixel data are adjacent to the pixels having the value of C; the value of D is set to the pixels whose pixel data are adjacent to the pixels having the value of D.

In other words, as shown in FIG. 11A, pixel data of pixels generated by the nearest neighbor interpolation method are given the values equal to the pixel data of the nearest pixels of the original image (A and B in FIG. 11A).

On the other hand, in the linear interpolation method, the pixel data (density) of pixels generated after the enlargement are obtained by linearly interpolating the pixel data of the respective pixels of the original image, which are located at both ends of the generated pixels. As shown in FIG. 11B, pixel data of pixels generated by the linear interpolation method are given the values between pixel data of one pixel of the original image and pixel data of the other pixel of the original image, which are located at the respective ends of the generated pixels. (In FIG. 11B, between A and B).

Accordingly, the image enlarged by the nearest neighbor interpolation method tends to have relatively high sharpness, and the image enlarged by the linear interpolation method tends to have relatively low sharpness.

Figure 18A:
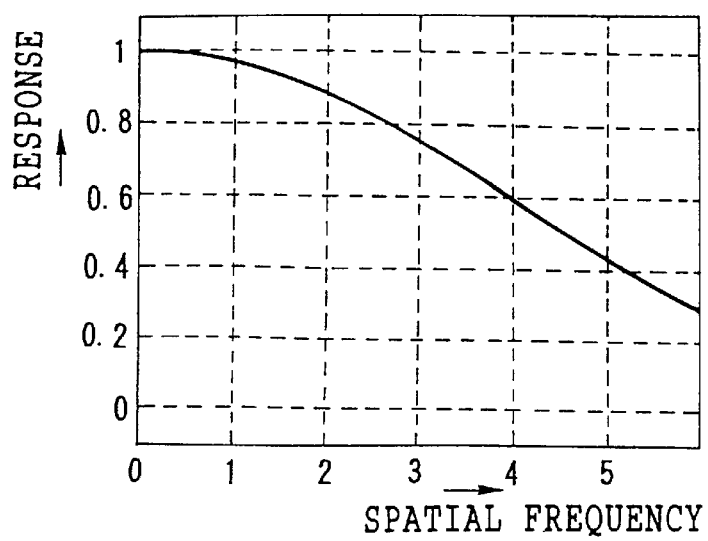
FIGS. 18A to 18C each show a graph which shows the spatial frequency characteristics of an image signal on which enlargement/reduction processing has been effected.
Figure 18B:
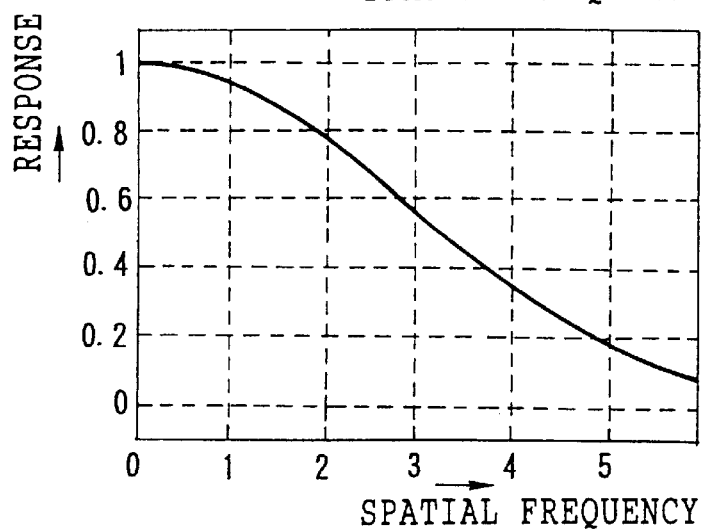
Figure 18C:
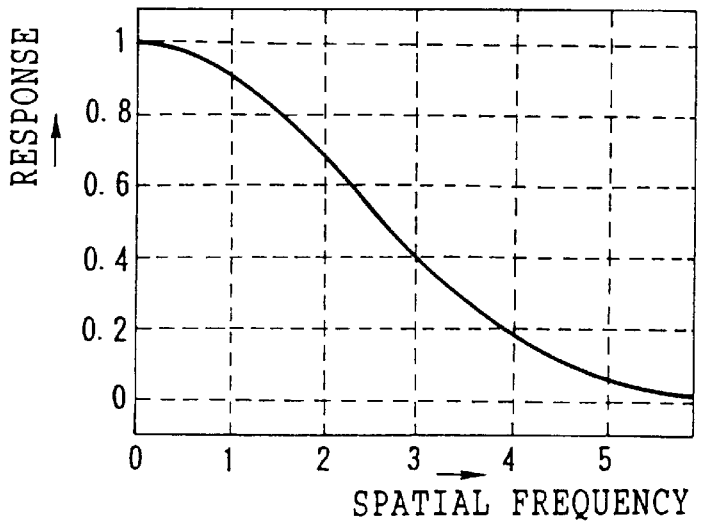

From the above description, and from the description given above with reference to FIGS. 18B and 18C, it is understood that a print having a higher image quality can be produced if the degree of enhancement of the sharpness enhancement processing is changed according to the type of enlargement/reduction method. Accordingly, in the second embodiment, when an image on which the sharpness enhancement processing has been effected is formed in step 106', a response of the spatial frequency characteristics of an image signal on which the sharpness enhancement processing has been effected is adjusted according to the spatial frequency characteristics of the enlargement processing or the reduction processing that has been carried out in the above step 101.

More specifically, the sharpness enhancement processing is carried out in such a way that the maximum value of responses of the spatial frequency characteristics, in which the spatial frequency characteristics of an image signal on which the enlargement/reduction processing has been effected (see FIG. 12B) and the spatial frequency characteristics of an image signal on which the sharpness enhancement processing has been effected are combined, is a value in the range of 1.0 to 2.5 times the maximum value of responses of the spatial frequency characteristics of the original image signal $S_{org}$. It should be noted that the respective values of 1.0 and 2.5, which are described above, are values obtained by adding the responses of the spatial frequency characteristics on which the enlargement/reduction processing has been effected, to the results of the subjective evaluation in a case where the above-described enlargement/reduction processing is not carried out.

Figure 12A:
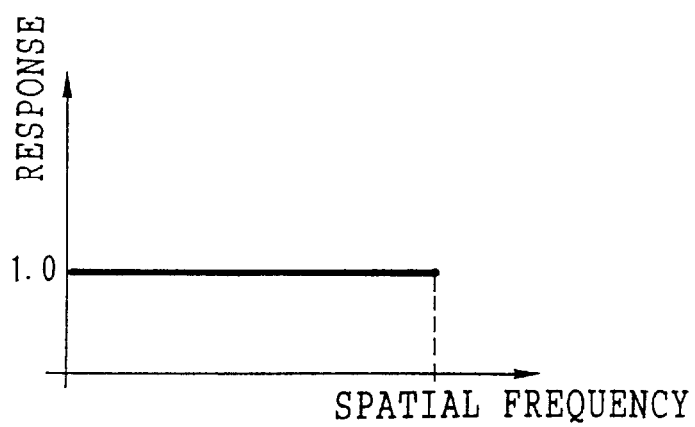
FIGS. 12A to 12C are graphs respectively illustrating an example of the spatial frequency characteristics in each process of the sharpness enhancement processing in the second embodiment.
Figure 12B:
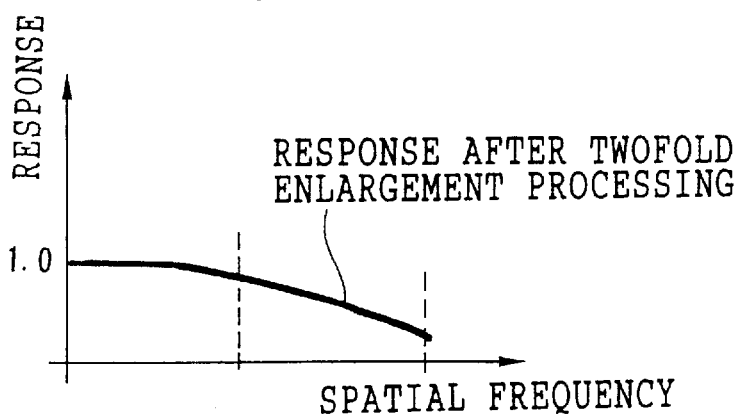
Figure 12C:
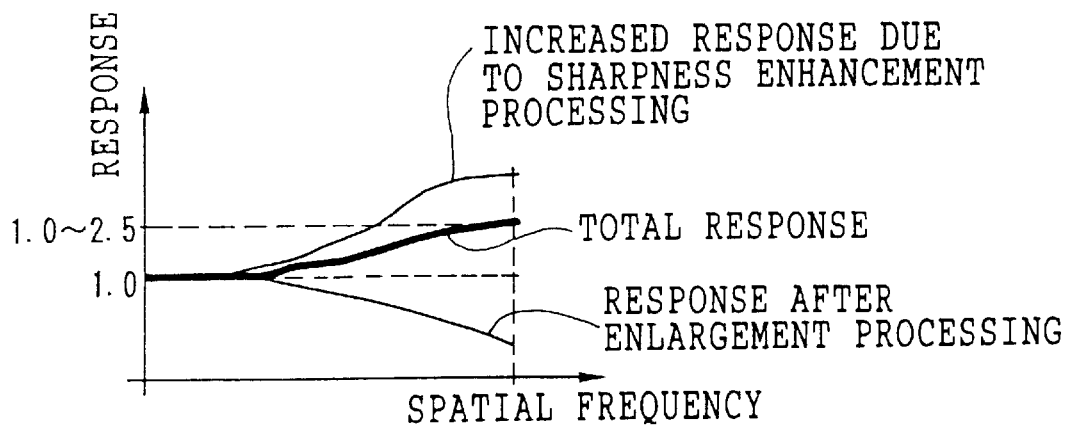

Accordingly, as described in FIG. 12C, the maximum value of responses of the spatial frequency of the image signal $S_{proc}$ obtained by the above-described sharpness enhancement processing is a value in the range of 1.0 to 2.5 times the maximum value of responses of the spatial frequency characteristics of the original image signal $S_{org}$ (See FIG. 12A).

As is shown in detail in the above description, in the image processing method and the image processing device relating to the second embodiment, the sharpness enhancement processing is carried out in such a manner that the maximum value of responses of the spatial frequency characteristics in which the spatial frequency characteristics of an image signal on which the enlargement/reduction processing has been effected and the spatial frequency characteristics of an image signal on which the sharpness enhancement processing has been effected are combined, is a value in the range of 1.0 to 2.5 times the maximum value of responses of the spatial frequency characteristics of the original image signal $S_{org}$. Accordingly, the sharpness enhancement processing can be carried out under preferred processing conditions in accordance with the type of enlargement processing or reduction processing.

Further, in the image processing method and the image processing device relating to the second embodiment, as the image signal $S_{proc}$ is prepared by taking into consideration the values obtained by the expression (1) with the use of the contrast table and the density dependent table, an image signal $S_{proc}$ whose noise is not conspicuous and which has a high image quality can be obtained.

Moreover, in the image processing method and the image processing device relating to the second embodiment, the spatial frequency characteristics of the non-sharp mask signal $S_{us}$ are such that on an image outputted by using an image signal on which the spatial frequency enhancement processing has been effected, a response of the spatial frequency of 0 to 0.5 cycle/mm is equal to or less than 1.2 times a response before the spatial frequency enhancement processing. Accordingly, the degree of enhancement in the low frequency region can be suppressed, and an image signal whose noise is less conspicuous and which has a high image quality can be obtained.

It should be noted that in the second embodiment, there has been described a case in which the sharpness enhancement processing is carried out under preferred processing conditions in accordance with the type of enlargement/ reduction processing. However, the present invention is not limited to the same, and a structure may be employed in which the sharpness enhancement processing is carried out under preferred processing conditions in accordance with the scale of enlargement when the enlargement processing is carried out or in accordance with the scale of reduction when the reduction processing is carried out.

More specifically, as the scale of enlargement increases, the response of the spatial frequency characteristics of the image signal on which the spatial frequency enhancement processing has been effected is decreased, and as the scale of reduction increases, the above response is increased.

Third Embodiment

Next, a description will be given of the third embodiment relating to the present invention. It should be noted that the structure of the image processing system 10 relating to the third embodiment is the same as that of the first and second embodiments described above. Therefore, the description thereof will be omitted.

Figure 13:
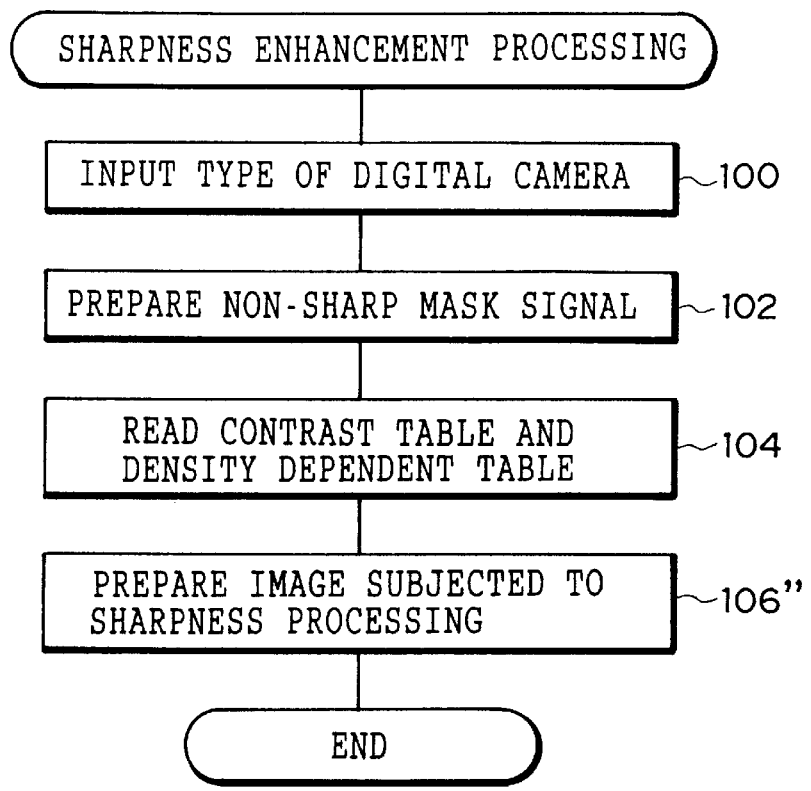
FIG. 13 is a flow chart illustrating the procedures of sharpness enhancement processing in a third embodiment.

First, referring to the flow chart of FIG. 13, a description will be given of sharpness enhancement processing that is carried out when the image processing engine 62 (the CPU 40 of the image data exchanger 14) in the third embodiment executes the sharpness enhancement processing program. It should be noted that the steps of FIG. 13 that carry out the same processing as in FIG. 5 are denoted by the same step numbers as in FIG. 5, and the description thereof will be limited.

In step 106", the image signal $S_{org}$ on which the sharpness enhancement processing has been effected is prepared by the following expression (4).

$$S_{proc}=S_{org}+K\times(S_{org}-S_{us}) \tag{4}$$

Here, K expresses the degree of enhancement, by which the maximum value of responses of the spatial frequency characteristics of the image signal $S_{proc}$ is made a value in the range of 1.5 to 3.0 times the maximum value of responses of the spatial frequency characteristics of the original image signal $S_{org}$.

As is shown in detail in the above description, in the image processing method and the image processing device relating to the third embodiment, the maximum value of responses of the spatial frequency characteristics of the image signal $S_{prog}$ on which the sharpness enhancement processing has been effected is a value in the range of 1.5 to 3.0 times the maximum value of responses of the spatial frequency characteristics of the original image signal $S_{org}$. Accordingly, as in the case with the above-described first embodiment, the sharpness enhancement processing can be carried out under preferred processing conditions.

It should be noted that in the first to third embodiments described above, there has been described a case in which the non-sharp mask signal $S_{us}$ is prepared by preparing the non-sharp mask signal $S_{us}$ of an attention point based on the pixel data of pixels of the total nine points (a region of 3 points×3 points), i.e., the attention point and eight other points adjacent to the attention point. However, the present invention is not limited to the same. For example, a structure may be employed in which the non-sharp mask signal of an attention point is prepared based on the pixel data of pixels of a total of 25 points (a region of 5 points×5 points), i.e., the attention point and 24 other points that are the closest to the attention point.

Further, in the first to third embodiments described above, there has been described a case in which the value of the function F ($S_{ong}-S_{us}$) and the value of the function G ($S_{org}$) are obtained by the contrast table and the density dependent table, respectively. However, the present invention is not limited to the same, and a structure may be employed in which functions that have the characteristics shown in the respective tables are readied in advance so that the values are obtained by the calculation using the functions. In this case, the storage capacity for storing the respective tables can be omitted, yet a predetermined calculation time is required.

Moreover, in the first to third embodiments described above, there has been described a case in which the contrast table such as that shown in FIG. 3 is used. However, the present invention is not limited to the same, and any table can be applied as long as it meets the conditions shown in the fourth aspects (the function F ($S_{org}-S_{us}$) has the characteristics that, when the absolute value of a contrast value, which is obtained by subtracting the non-sharp mask signal $S_{us}$ from the original image signal $S_{org}$, is smaller than a predetermined threshold value, the function F($S_{org}-S_{us}$) is smaller than the contrast value).

FIGS. 8A and 8B show examples of the function F ($S_{org}-S_{us}$) that the inventors actually use in a case when the respective pixels of the original image signal $S_{org}$ are expressed by 8 bits (values from 0 to 225). It should be noted that the values of threshold T that are actually used in the tables are values in the range of 2 to 10% of the maximum value (225) of the original image signal $S_{org}$ (that is, approximately 8.5 in FIG. 8A and approximately 14.5 in FIG. 8B).

Fourth Embodiment

Next, a description will be given of the fourth embodiment relating to the present invention. In the fourth embodiment, a structure will be described in which the sharpness enhancement processing is not carried out on the original image signal $S_{org}$ in real space but the sharpness enhancement processing is carried out after the original image signal $S_{org}$ is converted into a signal on the frequency axis. It should be noted that the structure of the image processing system 10 in the fourth embodiment is the same as that of the first to third embodiments described above. Therefore, the description thereof will be omitted.

First, referring to the flow chart of FIG. 14, a description will be given of sharpness enhancement processing that is carried out when the image processing engine 62 (the CPU 40 of the image data exchanger 14) of the fourth embodiment executes the sharpness enhancement processing program.

Figure 14:
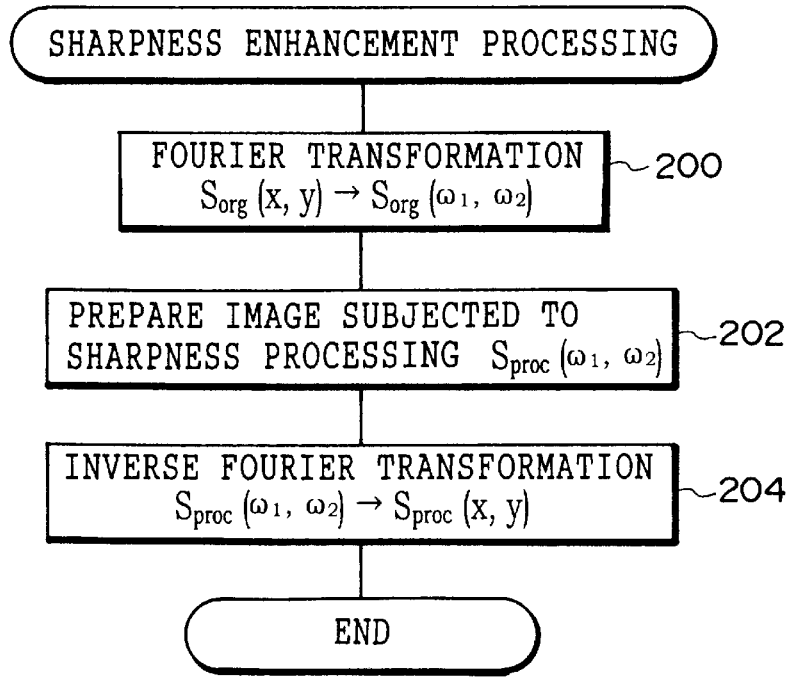
FIG. 14 is a flow chart illustrating the procedures of sharpness enhancement processing in a fourth embodiment.
Figure 15A:
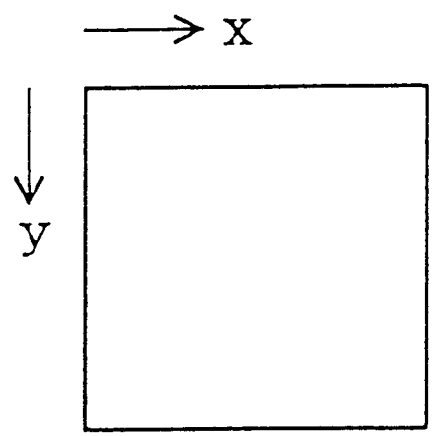
FIGS. 15A and 15B are schematic views respectively showing a real space condition and a frequency space condition.
Figure 15B:
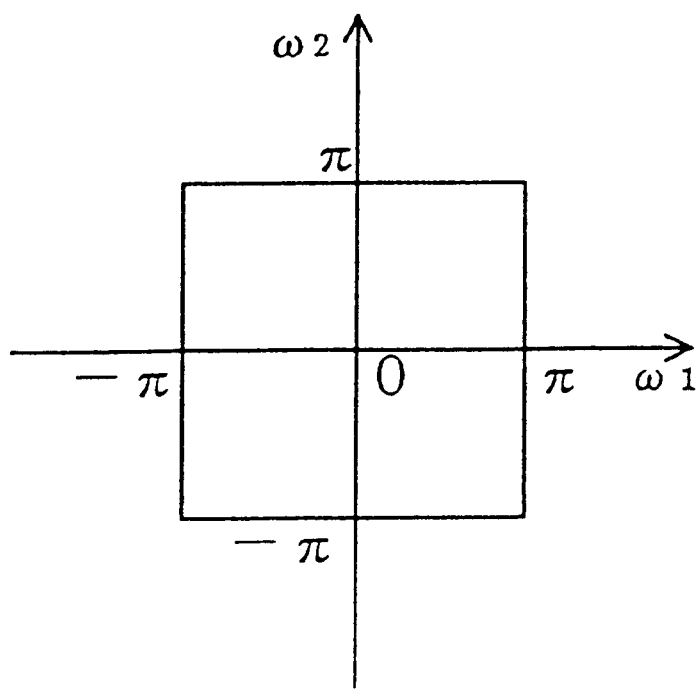

In step 200 in FIG. 14, an original image signal $S_{org}$ (x, y) in real space is converted into a signal $S_{org}(\omega_1, \omega_2)$ on the frequency axis by a Fourier transformation. As the result of the conversion, the original image signal $S_{org}$ (x, y) is converted from a signal in the real space of the x-y coordinate system as shown in FIG. 15A into a signal in the frequency space as shown in FIG. 15B.

In the subsequent step 202, the image signal $S_{proc}(\omega_1, \omega_2)$ on which the sharpness enhancement processing has been effected is prepared by the following expression (5).

$$S_{proc}(\omega_1,\omega_2)=S_{org}(\omega_1,\omega_2)\times H(\omega_1,\omega_2) \quad (5)$$

Here, H ($\omega_1$, $\omega_2$) is a high frequency enhancement filter, which is structured as a filter to increase signals of the peripheral portion of the frequency space (where the absolute value of $\omega$ is around $\eta$).

FIG. 16A is an example of the high frequency enhancement filter of one dimension, which can be expressed by the following expression (6).

$$H(\omega)=1+c\{\sin^2(\omega/2)\} \quad (6)$$

Here, c is a constant which is c>0, and by changing the value of c, the condition of the curve in FIG. 16A can be changed.

Further, FIG. 16B is an example of the high frequency enhancement filter of the two dimensions, which can be expressed by the following expression (7).

$$H(\omega_1,\omega_2)=1+c\{\sin^2(\omega_1/2)+\sin^2(\omega_2/2)\} \quad (7)$$

Here, c is a constant which is c>0, and by changing the value of c, the condition of the curved surface in FIG. 16B can be changed.

In other words, in the original image signal $S_{org}(\omega_1, \omega_2)$ in the frequency space, the nearer to the center in the frequency space shown in FIG. 15B, the lower the frequency is. Accordingly, in the sharpness enhancement processing for enhancing the high frequency band, a filter such as that enhancing the region in which the absolute value of $\omega$ is around $\pi$ is used.

After the preparation of the image signal $S_{proc}(\omega_1, \omega_2)$ is completed, in the next step 204, the image signal $S_{proc}(\omega_1, \omega_2)$ in the frequency space is converted into an image signal $S_{proc}$ (x, y) in the real space by inverse Fourier transformation.

It should be noted that in the fourth embodiment, the value of the constant c in the high frequency enhancement filter is adjusted in such a manner that the maximum value of responses of the spatial frequency characteristics of the image signal $S_{proc}$ (x, y) is a value in the range of 1.5 to 3.0 times the maximum value of responses of the spatial frequency characteristics of the original image signal $S_{org}$ (x, y).

Figure 17A:
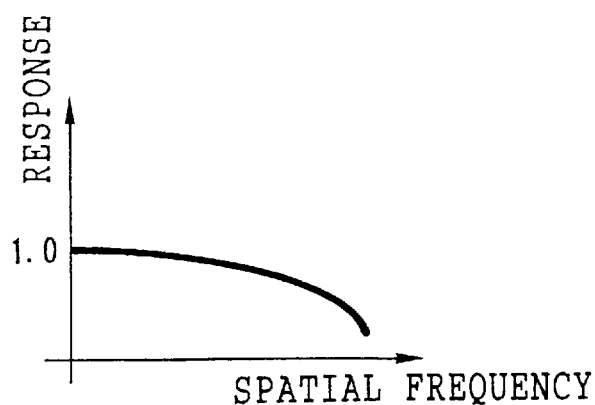
FIGS. 17A to 17C are graphs respectively showing an example of the spatial frequency characteristics in each process of the sharpness enhancement processing in the fourth embodiment.
Figure 17B:
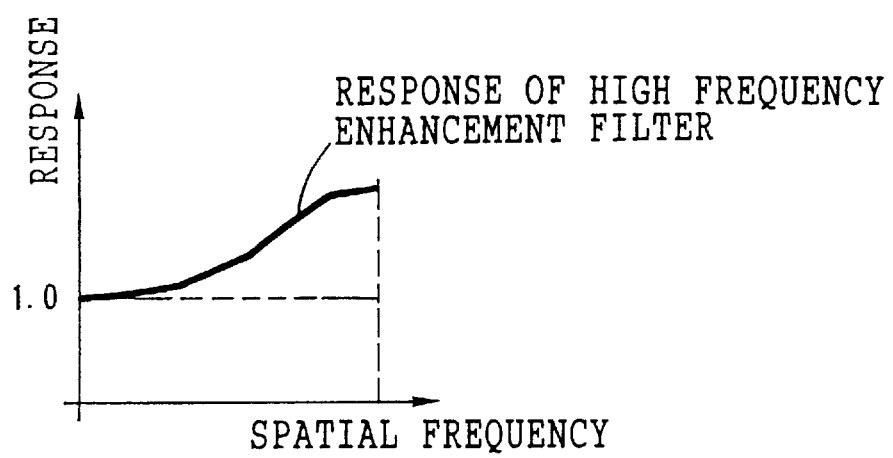
Figure 17C:
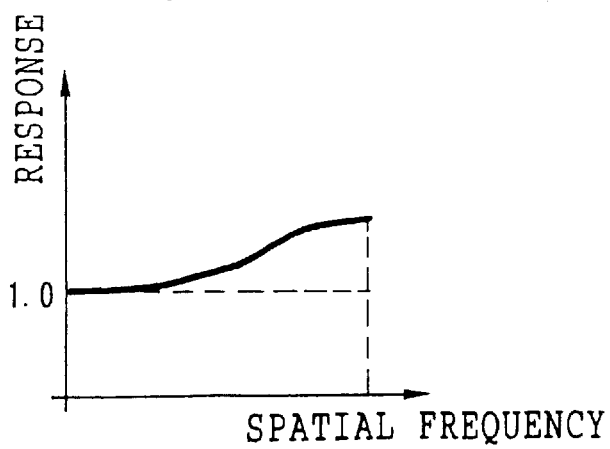

In other words, as shown in FIG. 17A, the response of the spatial frequency characteristics of the original image signal $S_{org}$ in the frequency space usually decreases as the spatial frequency goes up. Thus, the high frequency band is enhanced by use of the high frequency enhancement filter having the spatial frequency characteristics shown in FIG. 17B so that the image signal has the enhanced high frequency band, as shown in FIG. 17C.

As is shown in detail in the above explanation, in the image processing method and the image processing device relating to the fourth embodiment, the maximum value of responses of the spatial frequency characteristics of the image signal $S_{proc}$ on which the sharpness enhancement processing has been effected is a value in the range of 1.5 to 3.0 times the maximum value of responses of the spatial frequency characteristics of the original image signal $S_{org}$. Accordingly, as in the case with the above-described first and third embodiment, the sharpness enhancement processing can be carried out under preferred processing conditions.

It should be noted that in the fourth embodiment, FIGS. 16A and 16B have illustrated examples of the high frequency enhancement filter. However, the present invention is not limited to the same. Any filter can be applied as long as it enhances the high frequency band of the original image signal $S_{org}(\omega_1, \omega_2)$ in the frequency space.

What is claimed is:

1. An image processing method, wherein a spatial frequency enhancement processing is carried out on an original image signal obtained by photography using a digital still camera in such a manner that a maximum value of responses of the spatial frequency characteristics of an image signal on which the spatial frequency enhancement processing has been effected is a value substantially in the range of 1.5 to 3.0 times a maximum value of responses of the spatial frequency characteristics of the original image signal on which the spatial frequency enhancement processing has not been effected yet, and wherein the spatial frequency enhancement processing is carried out based on the following expression:

$$S_{proc}=S_{org}+G(S_{org})\times F(S_{org}-S_{us})$$

in which $S_{org}$ expresses the original image signal, $S_{us}$ expresses a non-sharp mask signal, G ($S_{org}$) expresses a function dependent on the original image signal $S_{org}$, and F ($S_{org}-S_{us}$) expresses a function dependent on a contrast value of the original image signal, wherein the contrast value is obtained by subtracting the non-sharp mask signal $S_{us}$ from the original image signal $S_{org}$.

2. The image processing method according to claim 1, wherein the spatial frequency characteristics of the non-sharp mask signal $S_{us}$ is such that on an image outputted by using an image signal on which the spatial frequency enhancement processing has been effected utilizing the non-sharp mask signal $S_{us}$, a response of the spatial frequency of 0 to 0.5 cycle/mm is equal to or less than 1.2 times the response of the image signal on which the spatial frequency enhancement processing has not been effected yet.

3. The image processing method according to claim 1, wherein a magnitude of the function F ($S_{org}-S_{us}$) is smaller than a magnitude of the contrast value if the magnitude of the contrast value is below a predetermined contrast threshold.

4. The image processing method according to claim 2, wherein a magnitude of the function F ($S_{org}-S_{us}$) is smaller than a magnitude of the contrast value if the magnitude of the contrast value is below a predetermined contrast threshold.

5. The image processing method according to claim 3, wherein the function F ($S_{org}-S_{us}$) is 0 when the magnitude of the contrast value is smaller than the predetermined contrast threshold.

6. The image processing method according to claim 4, wherein the function F ($S_{org}-S_{us}$) is 0 when the magnitude of the contrast value is smaller than a predetermined contrast threshold.

7. The image processing method according to claim 1, wherein a value of the function G ($S_{org}$) decreases as a density of the image on which the spatial frequency enhancement processing has not been effected yet increases.

8. The image processing method according to claim 2, wherein a value of the function G ($S_{org}$) decreases as a density of the image on which the spatial frequency enhancement processing has not been effected yet increases.

9. An The image processing method according to claim 3, wherein a value of the function G ($S_{org}$) decreases as a density of the image on which the spatial frequency enhancement processing has not been effected yet increases.

10. The image processing method according to claim 5, wherein a value of the function G ($S_{org}$) decreases as a density of the image on which the spatial frequency enhancement processing has not been effected yet increases.

11. An image processing method, wherein an enlargement processing or reduction processing is carried out on an original image signal obtained by photography using a digital still camera, and, in carrying out a spatial frequency enhancement processing, a response of the spatial frequency characteristics of an image signal on which the spatial frequency enhancement processing has been effected is adjusted according to the spatial frequency characteristics of the enlargement processing or the reduction processing, and
wherein the adjustment is such that a maximum value of responses of the spatial frequency characteristics, in which the spatial frequency characteristics of the enlargement processing or the reduction processing and the spatial frequency characteristics of the image signal on which the spatial frequency enhancement processing has been effected are combined, is a value in the range of 1.0 to 2.5 times a maximum value of responses of the spatial frequency characteristics of the original image signal on which the spatial frequency enhancement processing has not been effected yet.

12. An The image processing method according to claim 11, wherein the adjustment is an adjustment in accordance with a scale of enlargement when the enlargement processing is carried out, or with a scale of reduction when the reduction processing is carried out.

13. An image processing device, comprising:
enlargement/reduction means for carrying out enlargement processing or reduction processing on an original image signal obtained by photography using a digital still camera; and
adjusting means for adjusting a response of the spatial frequency characteristics of an image signal on which the spatial frequency enhancement processing has been effected, according to the spatial frequency characteristics of the enlargement processing or the reduction processing,
wherein the adjustment is such that a maximum value of responses of the spatial frequency characteristics, in which the spatial frequency characteristics of the enlargement processing or the reduction processing and the spatial frequency characteristics of the image signal on which the spatial frequency enhancement processing has been effected are combined, is a value in the range of 1.0 to 2.5 times a maximum value of responses of the spatial frequency characteristics of the original image signal on which the spatial frequency enhancement processing has not been effected yet.

14. A recording medium having a program recorded thereon for allowing a computer to execute processing that includes:
a step in which enlargement processing or reduction processing is carried out on an original image signal obtained by photography using a digital still camera; and
a step in which a response of the spatial frequency characteristics of an image signal on which the spatial frequency enhancement processing has been effected is adjusted according to the spatial frequency characteristics of the enlargement processing or the reduction processing,
wherein the adjustment is such that a maximum value of responses of the spatial frequency characteristics, in which the spatial frequency characteristics of the enlargement processing or the reduction processing and the spatial frequency characteristics of the image signal on which the spatial frequency enhancement processing has been effected are combined, is a value in the range of 1.0 to 2.5 times a maximum value of responses of the spatial frequency characteristics of the original image signal on which the spatial frequency enhancement processing has not been effected yet.

15. The image processing method according to claim 1, wherein an enhancement is suppressed for image portions whose frequency bands are below a predetermined frequency threshold.

16. The image processing method according to claim 1, wherein an enhancement is suppressed for image portions whose contrasts are below a predetermined contrast threshold.

17. The image processing method according to claim 1, wherein the spatial frequency enhancement processing is carried out based on the following expression:

$$S_{proc}(\omega_1,\omega_2)=S_{org}(\omega_1,\omega_2) \times H(\omega_1,\omega_2)$$

in which $S_{org}(\omega_1, \omega_2)$ represents an original signal $S_{org}(x, y)$ is converted into a signal on a frequency axis and $H(\omega_1, \omega_2)$ is a high frequency enhancement filter.

18. The image processing method according to claim 17, wherein $H(\omega_1, \omega_2)=1+c\{\sin^2(\omega_1/2)+\sin^2(\omega_2/2)\}$ and c is a constant value above 0.

* * * * *